US012638008B2

(12) United States Patent
Rastegar

(10) Patent No.: US 12,638,008 B2
(45) Date of Patent: May 26, 2026

(54) ELECTRICAL GENERATORS FOR RAILWAYS

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 18/203,612

(22) Filed: May 30, 2023

(65) Prior Publication Data

US 2023/0392587 A1 Dec. 7, 2023

Related U.S. Application Data

(60) Provisional application No. 63/412,398, filed on Oct. 1, 2022, provisional application No. 63/347,976, filed on Jun. 1, 2022.

(51) Int. Cl.
*F03G 7/08* (2006.01)

(52) U.S. Cl.
CPC ........ *F03G 7/083* (2021.08); *F05B 2220/706* (2013.01); *F05B 2260/421* (2013.01); *F05B 2260/502* (2013.01)

(58) Field of Classification Search
CPC ...... F03G 7/083; F03G 7/08; F05B 2220/706; F05B 2260/421; F05B 2260/502
See application file for complete search history.

(56) References Cited

U.S. PATENT DOCUMENTS

2022/0337124 A1* 10/2022 Pan ........................ H02J 7/0042

* cited by examiner

*Primary Examiner* — Joseph Ortega

(57) ABSTRACT

A method for harvesting energy from a train passing over a railroad rail. The method including transferring a deflection of the rail from the train to a mechanical energy storage device; storing mechanical energy provided by the transfer mechanism until a predetermined amount of mechanical energy is stored; transferring the stored mechanical energy to a generator upon the stored mechanical energy reaching the predetermined amount; and converting the transferred mechanical energy to electrical energy.

7 Claims, 19 Drawing Sheets

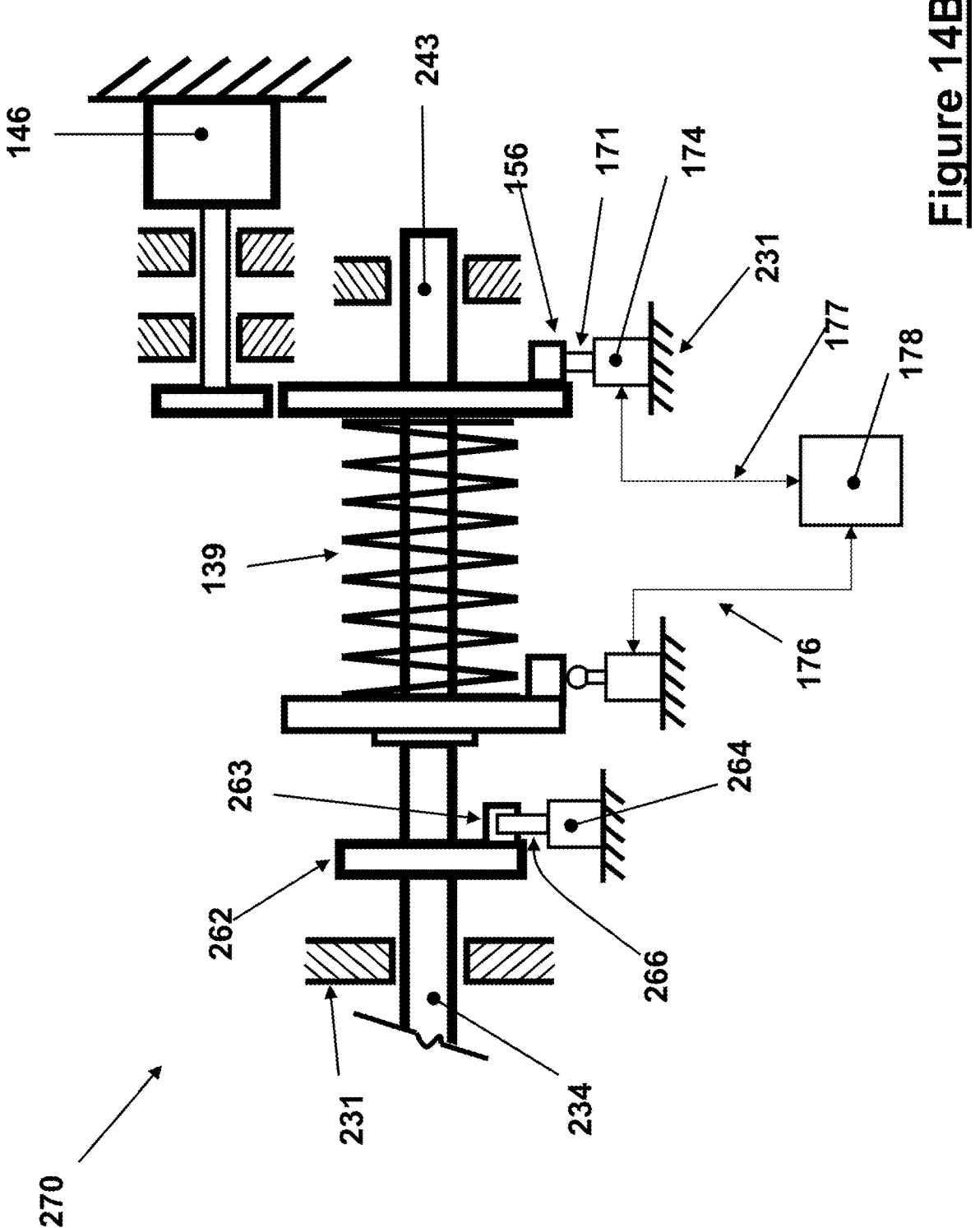
<u>Figure 14B</u>

Motion and/or Activity Sensor

Two-stage Railway Mechanical Energy Harvester

Electrical Energy Regulator, Charger and Power Distribution and Control Unit

Electrical Energy Storage Units

Powered Devices and Input Sensors

ELECTRICAL GENERATORS FOR RAILWAYS

CROSS-REFERENCE TO RELATED APPLICATIONS

This application claims the benefit if priority to U.S. Provisional Application No. 63/347,976, filed on Jun. 1, 2022 and 63/412,398, filed on Oct. 1, 2022, the entire contents of each of which are incorporated herein by reference.

BACKGROUND

1. Field

The present disclosure relates generally to electrical generators, and more particularly electrical generators for harvesting electrical energy in railways from passing trains to power various safety and related devices.

2. Prior Art

In recent years, particularly following the development of low-power electronics, sensors and wireless communications devices, electrical energy generators that harvest energy from the environment have seen great attention. The most common way of generating electrical energy is the use of magnets and coils using a rotary type of generator. Generators that harvest energy from vibration that use either coils and magnets or active materials such as piezoelectric materials-based devices have also been developed, particularly for low power consuming electronics. See for example, Rastegar, J., and Dhadwal, H., *Energy Harvesting—for low-power autonomous devices and systems*, SPIE Press, Bellingham, Washington (2017).

In general, energy harvesting devices using active materials such as piezoelectric elements can only provide small amounts of electrical power that is enough to power low-power electronics, sensors, and the like. When electrical energy needs to be generated at significantly higher rates than is possible by active materials, for example for powering LED lights, signals and other similar devices with significantly higher power requirements, then magnet and coil type generators, whether of linear type or the widely used rotary type, have to be used.

To efficiently generate electrical energy from mechanical energy using various types of magnets and coils arrangements, the input motion to the generator must be high in speed. This means that if a linear magnet and coil generator is to be used, then the input motion to the generator must be high in frequency so that high enough velocities are achieved at least during a portion of the motion cycle. If a rotary magnet and coil type generator is to be used, then the input rotational velocity can be relatively constant and high, such as in the order of several thousands. On the other hand, if the motion is oscillatory, such as vibratory or rocking or the like, then the frequency of vibration or rocking can be high, such as in the order of a few thousands when using magnet and coil type of mechanical to electrical energy transducer devices (electrical generators).

In all subway and other railroad tunnels, sufficient lighting must be provided so that in general and particularly in the case of a train having been disabled for some reason, there is enough lighting available so that the passengers and other railroad personnel could safely find their way to the exits or for the railway personnel, where they need to go.

Such tunnel lightings are currently powered directly by line power with back up rechargeable batteries that are kept charged by line power so that if the line power is lost, the rechargeable battery would power the lighting and any other emergency devices that are provided for a period of time, usually for 4-5 hours.

It is appreciated that in many tunnels, line power may be too costly to provide or may be lost due to certain environmental conditions or outages. In addition, provision of line power increases maintenance and service costs and requires personnel time, which means subway trains and other train traffic must be halted for a considerable amount of time. Providing line power to tunnels in remote locations would also be very costly.

Previous efforts for the development of energy harvesting devices for generating electrical energy from passing trains have concentrated on harvesting mechanical energy due to the bending deflection of rails due to the passing trains to generate electrical energy. For example, piezoelectric and inductive coil transducers have been used to harvest electrical energy from bending in the rail created by passing railcars (Nelson, C. A., Platt, S. R., Albrecht, D., Kamarajugadda, V., and Fateh, M., "Power harvesting for railroad track health monitoring using piezoelectric and inductive devices," Proceedings of the SPIE, Vol. 6928, April 2008). In this study, by mounting a piezoelectric element on the bottom of the rail, from the induced time-varying longitudinal strain in the piezoelectric transducer an average of 1 mW of power was produced. In this study, an inductive voice-coil device was also tested and utilized the vertical displacement of the rail to generate electrical energy, which also yielded an average power of 1 mW.

Other previous studies of harvesting power from railcar traffic have studies and developed laboratory prototypes of energy harvesting devices for harvesting electrical energy from vertical deflection of rails as the train cars passes over the rail (for example, see Hansen, S. E., Pourghodrat, A., Nelson, C. A., and Fateh, M., "On-track testing of a power harvesting device for railroad track health," Proceeding of the SPIE, Vol. 7650, 2010; Hansen, S. E., "Power Harvesting for Railroad Track Safety Enhancement Using Vertical Track Displacement," Master's Thesis, University of Nebraska-Lincoln August 2009; Pourghodrat, A., "Energy Harvesting Systems Design For Railroad Safety," Master's Thesis, University of Nebraska-Lincoln August 2011; Phillips, K., "Simulation and Control System of a Railroad Track Power Harvesting Device," Master's Thesis, University of Nebraska-Lincoln August 2011; and U.S. Pat. No. 9,394, 876).

Hansen, S. E., "Power Harvesting for Railroad Track Safety Enhancement Using Vertical Track Displacement," Master's Thesis, University of Nebraska-Lincoln, August 2009, and Phillips, K., "Simulation and Control System of a Railroad Track Power Harvesting Device," Master's Thesis, University of Nebraska-Lincoln August 2011, describe a device for harvesting power from railcar traffic. This energy harvester uses a rack and pinion gearing system in which the rack is anchored in the ground below the rail and tie and the pinion is mounted on a shaft with a base structure mounted on the tie between the rails. Then as the railcar passes over the rails between which the energy harvesting device is positioned, the deflection of the rail and tie (which is expected to be 0.1" to 0.25" depending on the weight of the railcar, and in other published literature indicates a range of 0.05" to 1.0") to force the pinion platform down relative to the fixed rack gear, therefore causing the gear to rotate. The small rotation of the pinion is then amplified by a 1:50 gear ration gearbox and in another prototype by a 1:100 gear ration gearbox to rotate the shaft of an electrical generator to generate electrical energy. The amount of electrical energy that is harvested are however low. For example, in the laboratory tests, continuous motion of a fully loaded train 280,000 lbs moving at 11.5 mph is determined to produce 0.34 Watts and continuous motion of a train without load with a weight of 58,000 lbs moving at 14.5 mph is determined to produce only Watts of power.

Another prior art rack-and-pinion based device for harvesting electrical energy from railway vertical displacement due to the passing train loading is described in the U.S. Pat. No. 9,394,876 and is shown in FIG. 1.

As can be seen in FIG. 1, the energy generating device includes a rail mount 102, a rack 200, a gear assembly 300, a generator 400, and an anchor 602. As a railway car passes over rails 800, the rails 800, as well as ties 900 deform downwards and upwards due to stress as the weight of the railway cars pass over the rails 800. Gear assembly 300 is coupled to ties 900, such that the gear assembly 300 also moves according to the deformation of the rails 800. Rack 200 is anchored to the ground or other fixed body via anchor 602.

As the gear assembly 300 rises and falls according to the deformation of the rails 800, the gear assembly 300 reciprocates vertically with respect to the rack 200. The gear assembly 300 engages with the rack 200 such that the vertical reciprocation of the gear assembly 300 is translated into a unidirectional rotation (i.e., the output of the gear assembly 300 rotates in a same direction according to both upwards and downwards movement of the rack) used to drive to the generator 400, which outputs electrical energy.

Another prior art rack-and-pinion based device for harvesting electrical energy from railway vertical displacement due to the passing train loading is described in the U.S. Pat. No. 9,394,876 and is shown in FIG. 2. In this embodiment, the rack 200 engages with the gear assembly 300 via first and second rack gears 210a and 210b positioned on opposite sides of the rack 200, such that the first rack gears 210a are disposed in a first orientation and the second rack gears 210b are disposed in a second orientation opposite the first orientation. The first rack gears 210a engage with a first pinion 310a and the second rack gears 210b engage with a second pinion 310b, such that the first and second pinion 210a and 210b simultaneously rotate in opposite directions to each other as the rack 200 reciprocates. The first pinion 310a is connected to first pinion shaft 320a via a first roller clutch 330a, while the second pinion 310b is connected to a second pinion shaft 320b via a second roller clutch 330b. The first roller clutch 330a is configured to rotate the first pinion shaft 320a when the first pinion 310a rotates clockwise but disengages from the first pinion shaft 320a when the first pinion 310a rotates counterclockwise.

Similarly, the second roller clutch 330b is configured to rotate the second pinion shaft 320b clockwise when the second pinion 310b rotates clockwise but disengages from the second pinion shaft 320b when the second pinion 310b rotates counterclockwise. The second pinion shaft 320b is also connected to the first pinion shaft 320a via a first transfer chain 340. Therefore, when the second pinion shaft 320b is driven clockwise, the second pinion shaft also drives the first pinion shaft 320a clockwise via the first transfer chain 340. Accordingly, when the rack 200 moves upwards, the first pinion shaft 320a is driven clockwise. Meanwhile, when the rack 200 moves downward, the second pinion shaft 320b is driven clockwise, which, in turn, drives the first pinion shaft 320a clockwise. Accordingly, the first pinion shaft 320a is driven clockwise by both upward and downward movement of the rack 200.

The first pinion shaft 320a is connected to the generator 400 via a second transfer chain 350. Accordingly, the first pinion shaft 320a provides a unidirectional rotational output to the generator 400, which, in turn, outputs a direct current according to both upwards and downwards motion of the rack 200.

The above rack-and-pinion based energy harvesting devices from railway vertical displacement due to the passing train loading and their alternative designs described in the U.S. Pat. No. 9,394,876 do not use high gear ratio speed increasing gearing (e.g., like the 1:50 or 1:100 gear ratio gearboxes used in the designs described in Hansen, S. E., "Power Harvesting for Railroad Track Safety Enhancement Using Vertical Track Displacement," Master's Thesis, University of Nebraska-Lincoln, August 2009), therefore the lower speed rotary speed of the device generators would yield significantly lower overall output efficiency.

As it is noted in the previously noted studies, laboratory as well as field test results have shown that currently disclosed energy harvesting devices based on using vertical displacement of rail and ties due to passing trains generate a very small amount of electrical energy, such as for lighter (not fully loaded cargo railcars) traveling at low speeds, for example, in the range of 10-15 mph. Such amounts of generated electrical energy are enough for powering sensors with low power electronics, but definitely not LED lighting for tunnels road-crossing signals and other similar applications. For this reason, in a university research study (Pourghodrat, A., "Energy Harvesting Systems Design for Railroad Safety," Master's Thesis, University of Nebraska-Lincoln August 2011), the development of a cam mechanism is suggested in which a cam engages the flange of the train wheel and is rotated as the wheel rolls over the rail. A cam and follower mechanism would then transmit the cam motion to rotate the input shaft of a generator to produce electrical energy. The basic idea of such cam and follower mechanism interacting with train wheel flange was introduced for train "Mechanical Wayside Lubrication Systems," by Portec Rail Products, Inc. of Huntington, WV, for lubricating the contact surface of the rail and wheel or wheel bearing automatically by passage of each railcar wheel. This device uses a cam mechanism that is coupled to a piston-type grease pump through a universal joint to provide a mechanical wayside lubrication system.

In this study and to address the major drawback of the rack-and-pinion energy harvesting devices that use vertical displacement of rail and tie as the railcar passes over, i.e., the very small vertical displacement of the rail and tie, such as if the passing train is not loaded, a device that uses a hydraulic cylinder to amplify the input motion, i.e., the vertical displacement of the rail and tie, is proposed. This is then suggested to be accomplished by deploying a hydraulic cylinder with a relatively large bore diameter and mounting it under the bottom surface of the rail. The relatively large bore diameter hydraulic cylinder is then compressed due to the vertical deflection of the rail as the railcar passes over the rail. Then due to its large bore diameter, the hydraulic cylinder is expected to eject a substantial amount of hydraulic fluid even for small input displacements. The output hydraulic fluid is then to be used to run a rotational hydraulic motor, which would in turn rotate the shaft of a generator to generate electrical energy.

It is appreciated by those skilled in the art that in all above prior art concepts and prototyped "railway energy harvesting power system" mechanisms, mechanical energy from the vertical motion/displacement of the rail and tie is directed directly, usually via gearing to increase rotary speed transmitted to the provided electrical generator of the system. The "railway energy harvesting power systems" using piezoelectric elements attached to the bottom surface of rails similarly transmit the mechanical strain energy directly to the piezoelectric transducer for conversion to electrical energy. For this reason, only a very small fraction of the available mechanical energy that the passing train can provide can be transferred to the harvested mechanism. For example, assuming that a partially loaded train exerts a force of around 20,000 N (about two tons) and deflect the rail 0.5" (around 12.5 mm), then a total mechanical energy EM that is available for harvesting is around $$E_M = 20000 \times 12.5 \times 10^{-3} = 250 \text{ J}$$

However, the previously described prior art "railway energy harvesting power systems", even in laboratory environment, have only been able to harvest a minute percentage of the available mechanical energy.

The main reason that prevents the prior art "railway energy harvesting power systems" from effectively converting a significant portion of the available mechanical energy to electrical energy is the attempt at direct transfer of the mechanical energy that is provided in a very short period of time as the train cars pass over the harvesting mechanism, such as at high speed. This is the case since the wheels of a train traveling at, for example 60 miles/hour would apply "motion pulses" that are around 40 milliseconds in duration, during which the harvesting mechanism is required to start from rest, accelerate during around 20 milliseconds during which the peak input displacement occurs. It is appreciated by those skilled in the art that mechanical mechanisms that are designed to directly transmit such "motion pulses" to electrical generators are very difficult, if not nearly impossible to design.

For a wheel flange actuated energy harvester, a modest two-ton (20,000 N) force applied by a railcar wheel that displaces the input to an energy harvesting device 1 inch (0.0254 m)—the flange depth of a train wheel—would make available 508 J of mechanical energy for conversion to electrical energy. Therefore, if the input to the energy harvester is from the wheel flange, for example during 30 degrees rotation of the wheel (0.24 m interfacing input lever), then the input mechanical energy pulse duration is reduced to around 1.6 milliseconds. For a wheel flange actuated energy harvester, transferring such a large amount of mechanical energy to an electrical energy generator and storing the generated electrical energy in a storage device, such as a rechargeable battery, in 1.6 milliseconds is a very difficult, if not nearly impossible task.

In addition, the "motion pulse" inputs to the energy harvesting mechanism for direct transfer, usually via some gearing or cam or other similar mechanisms, would also result very high acceleration and jerk pulses that act on the inertial of the energy harvesting mechanism and its various other components, thereby generating very high dynamic (inertial) forces/torques/moments that the system must withstand. Making the task of designing such energy harvesting systems that can operate at high train speeds, even less than 60 mph, very difficult, such as in the railway applications in which the system must operate tens of hundreds of thousands, in many cases millions of cycles a year without failure and without requiring frequent maintenance and service to keep it operational.

The prior art studies of using vertical deflection or the generated bending stress for harvesting electrical energy can only generate enough power for health monitoring or other low power applications.

The main reason for the failure of all attempted efforts at the development of an energy harvester that could harvest a significant portion of the large amount of mechanical energy that is available from passing railcars is that it becomes available only in very large magnitude but short duration pulses. In addition, since the input motions are very small, a very high input motion amplification mechanism (a factor of 50-100 in above studies) is needed to obtain large enough input rotary speed to an electrical generator of the device to operate efficiently. The design of a mechanical mechanism that could effectively respond to such large magnitude and short duration mechanical energy pulses is not practical, if not impossible.

SUMMARY

It is therefore desirable to provide methods to harvest electrical energy from the passing trains and electrical energy harvesting devices that use these methods to convert potential and/or kinetic (mechanical) energy from passing trains and convert it to electrical energy to either use it directly or store it in electrical energy storage devices such as capacitors and/or super-capacitors and/or rechargeable batteries. Hereinafter, such energy harvesting devices together with their mechanical to electrical energy transducers, electrical energy collection and electrical storage elements and related components are collectively related to as a "railway energy harvesting power system".

It is also appreciated that with the thousands of miles of railroads, there are a large number of remotely located road and walking path crossings without warning lights and sounds due to lack of electrical infrastructure. Therefore, electrical energy harvesting devices that can convert mechanical energy from passing trains to electrical energy could provide a way of powering such warning devices at such locations. In addition, such electrical energy harvesting devices could also be used to power other low power sensory devices for track and train health monitory and warning devices. This has become particularly possible with the development of highly efficient and low power electronics and sensors, rechargeable batteries, and LED lights.

It is also desirable for the energy harvesting systems, including the energy harvesting device and their electrical collection and storage electronics and other related accessories, such as communications, sensory, lighting, etc., be modular and easy to install, maintain, service and replace to ensure low installation and maintenance cost as well as the time that may be required to close rail traffic for these tasks.

It is also desirable that the energy harvesting systems be capable of being manually operated, so that in emergency situations when the stored electrical energy in the system has been exhausted, the railroad personnel and others requiring to power lighting or other electrical and electronic devices could manually generate electrical energy.

It is also desirable that the energy harvesting component of the "railway energy harvesting power system" be capable of disengaging from passing train "actuation" mechanism once the electrical energy storage elements of the power system, for example, its rechargeable batteries, are full. The feature would help minimize wear and tear and extends the service life of the "railway energy harvesting power system".

It is also helpful if the mechanisms that "receives" mechanical energy in the form of mechanical potential or kinetic energy to be capable of operating efficiently with trains moving at slow as well as very high speeds, sometimes more than hundred miles/hour. This is a characteristic of the required train interfacing mechanisms since it would ensure "railway energy harvesting power system" reliability, long operational life and low service and maintenance costs by lowering component wear and tear.

It is also helpful if the mechanical energy transferred to the "mechanical energy collection mechanism" of the "railway energy harvesting power system" be efficiently converted to electrical energy and stored in the system electrical energy storage devices, even when the passing train speed is very high.

There is therefore a need for methods that can be used to develop electrical energy harvester generators that could efficiently generate electrical energy from passing trains along railroads and that would generate relatively large enough electrical energy that could be used directly or LED lighting, warning signals, sensory electronics, communication gear, and the like. For example, for LED lighting in tunnels, when power is lost, the "railway energy harvesting power system" is usually required to provide enough electrical energy to keep the lights on for 3-4 hours or more.

There is a need for methods to design energy harvesting generators that could efficiently generate electrical energy along railways from the passing trains and that could generate and store enough electrical energy in provided electrical energy storage devices such as rechargeable batteries, capacitors or super-capacitors or their combination that can be used to power LED lighting along the railway, such as in tunnels for safety of railway personnel working in the tunnel and passengers in case of emergency and power outage.

There is also a need for modular powering systems that use the developed energy harvesting electrical energy generators and electrical energy storage devices such as rechargeable batteries, capacitors or super-capacitors or the combination for powering LED lights and other sensory and communication electronics.

In certain locations, such modular powering systems may rely only on the harvested electrical energy. This can be the case when the powering system is located in remote areas where line power is not available. In other locations, the rail traffic is high enough to ensure that enough electrical energy is always stored in the powering system electrical storage devices to power LED lights and other sensory and communication electronics for a prescribed period of time, for example 3-4 hours when the train traffic is halted due to certain emergency situation or power outage. In such situations, other sensory inputs such as motion sensors or manually operated switches may be provided to, for example, turn the LED lighting on only when there are people around and thereby increase the period of time that the stored electrical energy is available when it is needed.

There is also a need for the modular energy harvesting based powering systems that can be installed and removed quickly and with minimal effort and without requiring any changes or modifications to the existing rail system. The modular energy harvesting based powering systems must also require minimal maintenance and service and be operational in almost any environmental condition, for example hot and cold weathers and rain and snow.

There is also a need for modular energy harvesting based powering systems that are capable of being manually operated, so that in emergency situations when the stored electrical energy in the system has been exhausted, the railroad personnel and others requiring to power lighting or other electrical and electronic devices could manually generate electrical energy.

There is also a need for methods to design the energy harvesting component of the "railway energy harvesting power system", i.e., the mechanical mechanism that interacts with the passing train and collects mechanical energy that is then transferred to the mechanical energy to electrical energy transducer component of the energy harvesting system, such that it is capable of disengaging from the passing train input/actuation mechanism once the electrical energy storage elements of the railway energy harvesting power system, for example, its rechargeable batteries, are full. The feature would help minimize wear and tear and extends the service life of the "railway energy harvesting power system".

Accordingly, methods are provided for the design of highly efficient energy harvesting mechanism that collects mechanical energy from passing train wheel motion and transfers it to mechanical energy to electrical energy transducers to generate electrical energy that is then collected by an electronic circuit and stored in an electrical energy storage device, such as a rechargeable battery and/or a capacitor and/or a super-capacitor. The energy harvesters can be developed that can harvest a significant portion of the large amount of mechanical energy that is available from passing railcars and that become available only in very large magnitude but short duration pulses. In addition, since the input motions are very small, a very high input motion amplification mechanism must be provided to obtain large enough input rotary speed to the electrical generator of the device to operate efficiently.

Furthermore, provided are highly efficient energy harvesting mechanisms to collect mechanical energy from passing train wheel motion and transfers it to mechanical energy to electrical energy transducers to generate electrical energy that is then collected by an electronic circuit and stored in an electrical energy storage device, such as a rechargeable battery and/or a capacitor and/or a super-capacitor.

Such generators can be based on commonly used permanent magnet and coil generators to convert mechanical energy to electrical energy. However, it is appreciated by those familiar with the art that other active materials or appropriate coil and magnet type of mechanical to electrical energy conversion devices can be used instead of or in combination with rotary permanent magnet type generators.

There is also a need for methods for the design of mechanisms that can efficiently "receive" mechanical energy in the form of potential energy and/or kinetic energy from passing trains that may be moving slowly or very rapidly (sometimes over 100 miles/hour) for hundreds of thousands and even millions of cycles without damage and with minimal wear and tear. This feature can be provided so that the "railway energy harvesting power system" would require minimal maintenance and service and need for replacement.

It is also helpful if the mechanisms that "receives" mechanical energy (hereinafter called the "mechanical energy collection mechanism") from the passing trains in the form of mechanical potential or kinetic energy to be capable of operating and interacting efficiently with trains moving at relatively slow speeds as well as very high speeds, sometimes more than 100 miles/hour. This is a helpful feature of the required train interfacing mechanisms of the "mechanical energy collection mechanism", since it would ensure "railway energy harvesting power system" reliability, long operational life and low service and maintenance costs by lowering component wear and tear.

It is also helpful if the mechanical energy transferred to the "mechanical energy collection mechanism" of the "railway energy harvesting power system" be efficiently converted to electrical energy and stored in the system electrical energy storage devices, even when the passing train speed is very high, sometimes over 100 miles/hour.

It is also helpful if the "mechanical energy collection mechanism" of the "railway energy harvesting power system" be capable of efficiently "collecting" and "storing" mechanical energy from passing train wheels when passing trains are traveling at a very wide range of speeds, including very low speeds as well as aforementioned high speeds. This requirement can eliminate most current art energy harvesting mechanisms that rely on input vibrational motions, such as those related to vertical motion of the rails due to the applied wheel load.

It is also helpful if the interaction of the energy harvesting mechanism with the wheels of the passing train does not impart high acceleration and jerk to the harvesting mechanism and its various components so that the "railway energy harvesting power system" can have a relatively simple design and that could reliably operate over many cycles, sometimes several million a year and without requiring frequent maintenance and service to keep it operational.

This is also the case for energy harvesting mechanisms that are designed to generate electrical energy from vertical displacement/motion of the rail and tie or by wheel flange actuation of the harvester input mechanism from passing trains as was previously described. Such "railway energy harvesting power system" must have relatively simple design and reliably operate over many cycles, sometimes several million a year and without requiring frequent maintenance and service to keep it operational.

Accordingly, methods and apparatus are provided that can efficiently "receive" mechanical energy in the form of potential energy and/or kinetic energy from passing trains that may be moving slowly or very rapidly (sometimes over 100 miles/hour) for hundreds of thousands and even millions of cycles without damage and with minimal wear and tear. This feature can be provided so that the "railway energy harvesting power system" would require minimal maintenance and service and need for replacement. The stored mechanical energy is then transferred to mechanical energy to electrical energy transducers to generate electrical energy that is then collected by an electronic circuit and stored in an electrical energy storage device, such as a rechargeable battery and/or a capacitor and/or a super-capacitor.

Furthermore, provided are highly efficient energy harvesting mechanisms to collect mechanical energy in the form of potential energy and/or kinetic energy from passing trains that may be moving slowly or very rapidly (sometimes over 100 miles/hour) for hundreds of thousands and even millions of cycles without damage and with minimal wear and tear. The stored mechanical energy is then transferred to mechanical energy to electrical energy transducers to generate electrical energy that is then collected by an electronic circuit and stored in an electrical energy storage device, such as a rechargeable battery and/or a capacitor and/or a super-capacitor.

A need therefore exists for methods to design energy harvesting mechanisms and other various components of "railway energy harvesting power systems" such that as they interact with train wheels to receive mechanical energy, they do not impart high acceleration and jerk to the harvesting mechanisms and its various components to make the resulting "railway energy harvesting power systems" reliable and require minimal maintenance and service. The designs must also be relatively simple and inexpensive to produce.

Similarly, there is also a need for methods to design energy harvesting mechanisms that would generate electrical energy from vertical displacement/motion of the rail and tie from passing trains as was previously described. Such "railway energy harvesting power systems" must have relatively simple design and reliably operate over many cycles, sometimes several million a year and without requiring frequent maintenance and service to keep it operational. The designs must also be relatively simple and inexpensive to produce.

Accordingly, methods and apparatus are provided for energy harvesting mechanisms and their various components that are to receive mechanical energy from passing train wheels to generate electrical energy. The resulting "railway energy harvesting power systems" are to be relatively simple, inexpensive to produce, reliable, and require minimal maintenance and service over a large number of cycles, sometimes several million a year.

Accordingly, also provided methods and apparatus for energy harvesting mechanisms and their various components that are to receive mechanical energy from vertical displacement/motion of passing trains to generate electrical energy. The resulting "railway energy harvesting power systems" are to be relatively simple, inexpensive to produce, reliable, and require minimal maintenance and service over a large number of cycles, sometimes several million a year.

It is also helpful if the methods used to develop "mechanical energy collection mechanisms" of the "railway energy harvesting power systems" do not rely electrical energy generators that require devices such as speed increasing devices and/or speed regulating devices for efficient generation of electrical energy as in practice, the train speed varies over a wide range of speeds.

Accordingly, "mechanical energy collection mechanisms" of the "railway energy harvesting power systems" are provided that can efficiently collect a significant portion of available mechanical energy from passing trains for conversion to electrical energy and that operate efficiently within a very wide range of passing train speeds, including very slow (less than mph) and very fast speeds (as high as 60-100 mph).

Furthermore "mechanical energy collection mechanism" designs are provided for "railway energy harvesting power systems" that can efficiently collect a significant portion of available mechanical energy from passing trains for conversion to electrical energy and that operate efficiently within a very wide range of passing train speeds, including very slow (less than mph) and very fast speeds (as high as 60-100 mph).

There is also a need for "railway energy harvesting power systems" that can operate in the harsh environment of train railways, including at very cold and hot temperatures and even under rain and snow and freezing conditions, since these are conditions that can cause power failures or signaling equipment failure and the like may disable trains and the emergency lighting and sensory communication devices that do not require line power are needed to operate reliably.

Accordingly, "railway energy harvesting power systems", including their components such as their "mechanical energy collection mechanisms" and their mechanical energy to electrical energy conversion mechanisms and devices and their electrical energy collection and storage electronics and storage elements, such as rechargeable batteries and/or capacitor and/or super-capacitors, are provided to reliably operate at the harsh environment of train railways, including at very cold and hot temperatures and ever under rain and snow and freezing conditions.

The present methods and apparatus can include two-stage mechanisms or operation. The input train wheel motion can drive the first stage mechanisms. The first stage mechanism would then store mechanical energy in a mechanical energy storage device in the form of potential and/or kinetic energy. Then when enough mechanical energy is stored in the mechanical energy storage device, the stored mechanical energy is passed to the mechanical energy to electrical energy conversion mechanism component of the power system. Such a two-stage mechanism would ensure efficient operation, i.e., efficient electrical energy generation, at both low and high passing train speeds.

There is also a need for "railway energy harvesting power systems" that can harvest the relatively large amount of mechanical energy that passing trains can provide to the system and effectively harvest a relatively large portion of it to electrical energy. This is in contrast to all proposed and tested "railway energy harvesting power systems" to date in which a very small fraction of the mechanical energy that is/can available is harvested.

This can be the case for "railway energy harvesting power systems" that are designed to generate electrical energy from the vertical motion/displacement of the rail and tie as train cars pass over the rail section. Here, the main challenge has been the very small displacement of the rail and tie under even heavily loaded trains, which make all the proposed energy harvesting mechanisms highly ineffective.

There is therefore a need for methods and mechanisms that would amplify the vertical displacement of rail and tie as train cars pass over the rail section so that the input mechanical energy that can be provided through the imparted deflection can be effectively transferred to the energy harvesting mechanism. It is appreciated by those skilled in the art that here, due to the high rail and tie displacing load due to the large weight of even unloaded train cars, the reduction in the rail and tie vertical displacement due to the presence of the energy harvesting mechanism is considered to be negligible. The methods must be capable of designing mechanisms that are capable of transferring a significant portion of the available mechanical energy from the passing train induced vertical displacement/motion of the rail and tie to the energy harvesting system.

Now, it is appreciated by those skilled in the art that since as it was previously described, a passing train traveling at relatively high speeds, for example at speeds of around 60 mph, can transfer large amounts of mechanical energy to energy harvesting devices, but in very short pulses of a few tens of milliseconds, for example 20-40 milliseconds and if the wheel flange motion is used to actuate the energy harvester input mechanism the pulse duration may be reduced to as low as 1.6 milliseconds, therefore a mechanical system to absorb and directly convert that mechanical energy to electrical energy using a generator is essentially impossible. This is the reason that all prior art energy harvesting devices have only been capable of harvesting and converting a very small amount of available mechanical energy to electrical energy. As an example, a 5 ton (5,000 Kg mass or 50,000 N force) of a train wheel that displaces the input to an energy harvesting device 1 inch (0.0254 m)—the flange depth of a train wheel—would make available mechanical energy $E_M$=(50,000 N)×(0.0254 m)=1,270 Joules. Noting that many such train wheels, and with significantly higher loads in the case of fully loaded trains, would pass in a matter of a few minutes or even seconds over the railway where the energy harvesting device is mounted, it becomes evident that the transfer of such a large amount of mechanical energy to an energy harvesting device for direct conversion to electrical energy is a very difficult task, if not nearly impossible.

It is therefore appreciated that an energy harvesting device (system) of a "railway energy harvesting power systems" could harvest a significant portion of the available mechanical energy from passing trains only if it is capable of "absorbing" and storing the available mechanical energy in a mechanical energy storage device over the relatively short duration of many train wheel passing over the energy harvesting mechanism along the railway and then use the stored mechanical energy to efficiently generate electrical energy using an electrical generator over a considerably longer period of time. The "absorbed" mechanical energy from the passing train may be stored in the form of potential and/or kinetic energy and transferred to the electrical energy generator component of the energy harvesting device.

It is also appreciated by those skilled in the art that as it was previously described, all prior art energy harvesting device are designed to directly convert the input mechanical energy from the passing train (either from vertical displacement/motion of the rail and tie or from interaction with the wheel flange) to electrical energy are designed to pass the input motion directly to the harvester generator, sometimes using speed increasing gearing. It is also appreciated by those skilled in the art that the generally used rotational electrical generators can efficiently produce electrical energy only when they run at relatively high and continuous rotational speeds. This is obviously not possible with any of the prior art energy harvesting devices, such as when the passing train is traveling at relatively slow speeds, for example in subway tunnels where the trains slow down to stop at a station and start slowly when they leave a station.

For this reason, it is helpful if the energy harvesting devices be capable of operating effectively independent of the speed of the passing trains, i.e., harvest a significant portion of the mechanical energy that becomes available from the passing trains to electrical energy when the passing train speed is low or is high.

There is therefore a need for methods to design energy harvesting devices (systems) for "railway energy harvesting power systems" that could effectively transfer a significant portion of available mechanical energy from passing trains to mechanical energy storage device(s) for subsequent efficient conversion to electrical energy by an appropriate mechanical to electrical energy devices such as the commonly used rotary generators. The methods are desired to be applicable to energy harvesting devices that transfer mechanical energy to the mechanical energy storage device (s) from the train wheel and also to energy harvesting devices that transfer mechanical energy to mechanical energy storage device(s) from the vertical displacement/motion of the rail and tie.

There is therefore also a need for methods and energy harvesting devices (systems) for "railway energy harvesting power systems" that could effectively transfer increasing amounts of available mechanical energy from passing trains that are moving relatively slowly to mechanical energy storage device(s) until enough mechanical energy is stored in the mechanical energy storage device(s) that would allow for subsequent efficient conversion to electrical energy by an appropriate mechanical to electrical energy devices such as the commonly used rotary generators.

Accordingly, methods and energy harvesting devices (systems) for "railway energy harvesting power systems" that could effectively transfer a significant portion of available mechanical energy from passing trains to mechanical energy storage device(s) for subsequent efficient conversion to electrical energy by an appropriate mechanical to electrical energy devices such as the commonly used rotary generators are provided. The methods are applicable to energy harvesting devices that transfer mechanical energy to the mechanical energy storage device(s) from the train wheel as well as to energy harvesting devices that transfer mechanical energy to mechanical energy storage device(s) from the vertical displacement/motion of the rail and tie.

Furthermore, energy harvesting devices (systems) are provided for "railway energy harvesting power systems" that can effectively transfer a significant portion of available mechanical energy from passing trains to mechanical energy storage device(s) for subsequent efficient conversion to electrical energy by an appropriate mechanical to electrical energy devices such as the commonly used rotary generators. Included are design of energy harvesting devices that transfer mechanical energy to the mechanical energy storage device(s) from the train wheel as well as designs of energy harvesting devices that transfer mechanical energy to mechanical energy storage device(s) from the vertical displacement/motion of the rail and tie.

There is therefore also a need for methods and energy harvesting devices (systems) for "railway energy harvesting power systems" that could effectively transfer and accumulate available mechanical energy from passing trains that are moving at slow speed (even as slow as 1-2 mph) to mechanical energy storage device(s) until enough mechanical energy is stored in the mechanical energy storage device(s) that would allow for subsequent efficient conversion to electrical energy by an appropriate mechanical to electrical energy devices such as the commonly used rotary generators. The methods are desired to be applicable to almost all energy harvesting mechanisms that can be developed for the "railway energy harvesting power systems", including those that harvest mechanical energy directly from the wheel or the passing railcars and those that harvest mechanical energy from the vertical displacement of rail due to the wheel loading.

Accordingly, methods and energy harvesting devices (systems) for "railway energy harvesting power systems" that could effectively transfer and accumulate available mechanical energy from passing trains that are moving at slow speed (even as slow as 1-2 mph) to mechanical energy storage device(s) until enough mechanical energy is stored in the mechanical energy storage device(s) that would allow for subsequent efficient conversion to electrical energy by an appropriate mechanical to electrical energy devices such as the commonly used rotary generators. The methods are provided that can be used to design energy harvesting mechanisms for "railway energy harvesting power systems", including those that harvest mechanical energy directly from the wheel or the passing railcars and those that harvest mechanical energy from the vertical displacement of rail due to the wheel loading.

Furthermore, energy harvesting devices (systems) are provided for "railway energy harvesting power systems" that can effectively transfer and accumulate available mechanical energy from passing trains that are moving at slow speed (even as slow as 1-2 mph) to mechanical energy storage device(s) until enough mechanical energy is stored in the mechanical energy storage device(s) that would allow for subsequent efficient conversion to electrical energy by an appropriate mechanical to electrical energy devices such as the commonly used rotary generators. Included are design of energy harvesting devices that transfer mechanical energy to the mechanical energy storage device(s) directly from the railcar wheel as well as designs of energy harvesting devices that transfer mechanical energy to mechanical energy storage device(s) from the vertical displacement/motion of the rail and tie.

There is also a need for a method of transferring the available mechanical energy from a passing railcar wheel or from the vertical displacement of the rail due to the railcar wheel load to the mechanical energy storage device that could transfer a significant portion of the available mechanical energy to the mechanical energy storage device with minimal induced component acceleration and jerk and other dynamic issues that increases the component wear and tear, reduces the life of the energy harvesting system and demand excessive service and maintenance efforts. Such methods of effective of transferring available mechanical energy from the passing of the railcar can be important for higher train speeds since the mechanical energy becomes available is numerous short "pulses", which have to be rapidly and effectively be transferred to the mechanical energy storage device during the available few milliseconds between each railcar wheel passing.

Accordingly, also provided are methods and systems with appropriate mechanisms for effectively transferring available mechanical energy from a passing railcar wheel or from the vertical displacement of the rail due to the railcar wheel load to a mechanical energy storage device with minimal induced component acceleration and jerk and other dynamic issues that increases the component wear and tear, reduces the life of the energy harvesting system and demand excessive service and maintenance efforts. The stored mechanical energy can then be transferred to the generator component of the "railway energy harvesting power system" for conversion to electrical energy. The methods can be used to design effective mechanical energy transfer mechanisms for railcar speeds that may be over 60 mph, such as in the railway applications in which the system must operate tens of hundreds of thousands, in many cases millions of cycles a year without failure and without requiring frequent maintenance and service to keep it operational.

Furthermore, mechanisms and related systems are provided for effectively transferring available mechanical energy from a passing railcar wheel or from the vertical displacement of the rail due to the railcar wheel load to a mechanical energy storage device with minimal induced component acceleration and jerk and other dynamic issues that increases the component wear and tear, reduces the life of the energy harvesting system and demand excessive service and maintenance efforts. The system may operate as a hybrid mechanical energy storage system in which the transferred mechanical energy is stored in a combination of mechanical potential energy and mechanical kinetic energy for transfer to the generator component of the "railway energy harvesting power system" for conversion to electrical energy.

As a result, the electrical energy generators can be very simple, can efficiently operate over a very large range of passing train speeds, and can require minimal service and maintenance.

BRIEF DESCRIPTION OF THE DRAWINGS

These and other features, aspects, and advantages of the present embodiments will become better understood with regard to the following description, appended claims, and accompanying drawings where:

FIG. 14B illustrates the top view "C" of the side view of the embodiment of FIGS. 13 and 13A of the with a modified way of stopping input mechanical energy into the harvester when the electrical energy storage devices of the harvester system are fully charged.

DETAILED DESCRIPTION

As it was previously indicated, mechanical energy may be transferred from the motion of the wheel flange, FIGS. 3 and 4, as it engages and actuated an appropriate mechanism and mechanical energy may also be transferred from the vertical displacement of the rail between ties to mechanisms, hereinafter called "railway mechanical energy harvesting devices" or "railway mechanical energy harvesters", for conversion to electrical energy. The methods to develop such mechanical energy harvesters are desired to a way of achieving designs that operate effectively at a wide range of railcar speeds, such as for railcar speeds of a few miles per hour to over 60 miles per hour.

Figure 5:
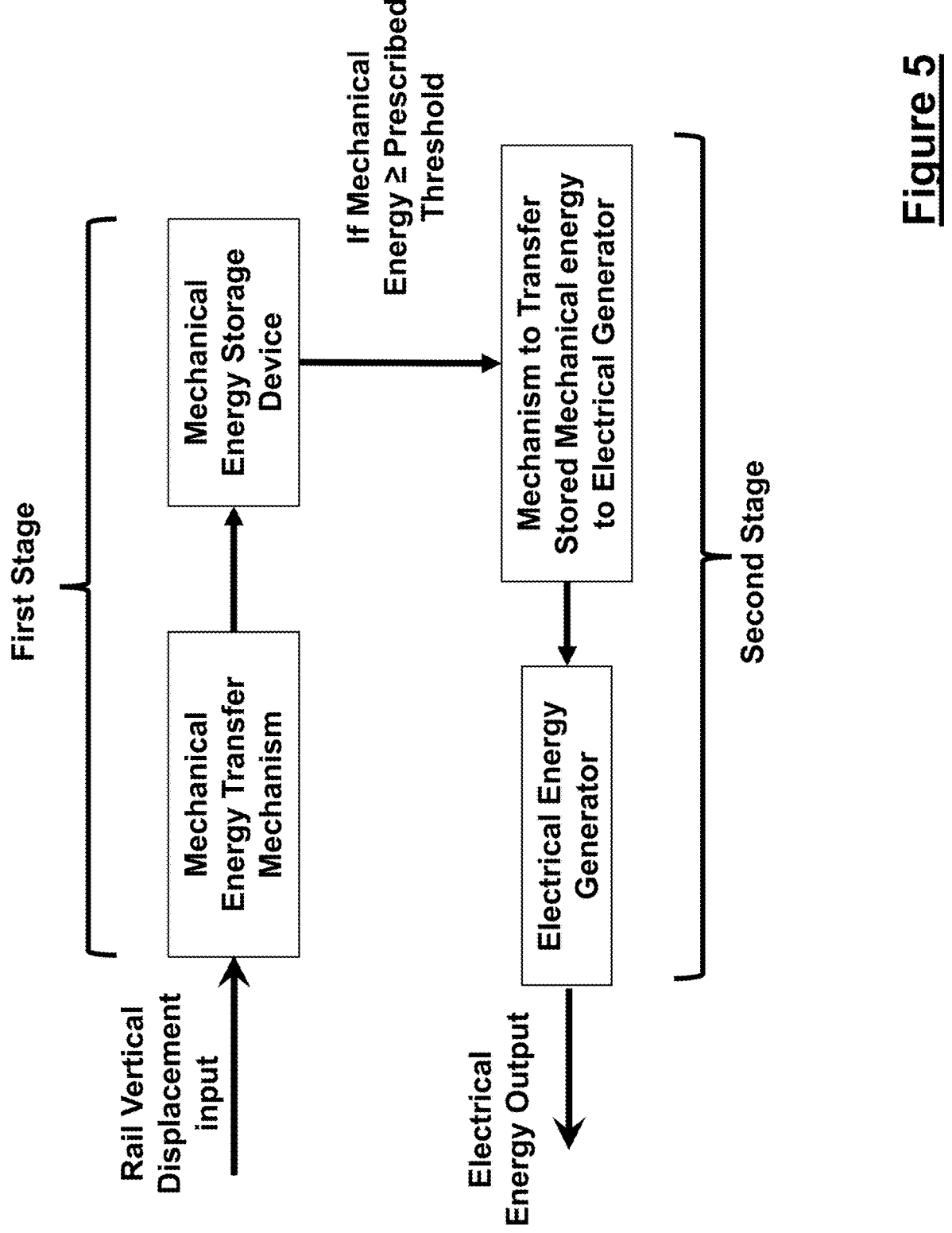
FIG. 5 illustrates the block diagram of the method to design "two-stage" "railway mechanical energy harvesters" for generating electrical energy from vertical displacement of rails due to railcar wheel loading.

The block diagram of a "two-stage" "railway mechanical energy harvester" for generating electrical energy from vertical displacement of rails due to railcar wheel loading is shown in FIG. 5. The prior art studies of using vertical deflection or the generated bending stress for harvesting electrical energy can only generate enough power for health monitoring or other low power applications. Track vertical displacements and their measurements for different track and support structure characteristics due to railcar wheel loading have been extensively studied and reported. For example, in "Measurement of Vertical Track Deflection from a Moving Rail Car, U. S. Department of Transportation, Federal Railroad Administrations, Final Report, February 2013"; "Real-Time Vertical Track Deflection Measurement System, PhD Thesis, University of Nebraska-Lincoln December 2008"; "Norman, C., Measurement of Track Modulus from a Moving Railcar, Master's Thesis, University of Nebraska-Lincoln May 2004"; and their provided references.

In the present method, as shown in the block diagram of FIG. 5, the railway energy harvester consists of two independently functioning stages. The input train wheel travels over the rail section where the energy harvester is positioned to drive the first stage mechanism. The first stage mechanism is configured to transfer the provided mechanical energy from the passing wheel loading to a mechanical energy storage device for storage in the form of mechanical potential energy.

As can be seen in the block diagram of FIG. 5, the first stage of the "two-stage" "railway mechanical energy harvesters" that are configured using this method comprises a "Mechanical Energy Transfer Mechanism", which is in engagement with the rail and is "actuated" by input rail vertical displacement or the railcar wheel flange actuated mechanism of the "Mechanical Energy Transfer Mechanism". It is appreciated that as indicated previously, the actuation of the "Mechanical Energy Transfer Mechanism" by the railcar wheel loading must be smooth with minimal shock loading of its components to ensure proper operation; effective mechanical energy transfer; and cause minimal wear and tear for low maintenance and service operation.

The "Mechanical Energy Transfer Mechanism" would then transfer the mechanical energy to a "Mechanical Energy Storage Device" over an appropriate length of time, usually longer than the time that is taken for the peak vertical rail displacement to occur, such as when the railcar is traveling at high speeds. The "Mechanical Energy Storage Device" is configured to receive and accumulate mechanical energy from multiple cycles of rail vertical displacements, until the stored mechanical energy level reaches a prescribed threshold.

The function of the second stage of the "two-stage" "railway mechanical energy harvesters", FIG. 5, is to provide a mechanism to transfer the stored mechanical energy to the harvester generator for conversion to electrical energy. As a result, mechanical energy is transferred from the "Mechanical Energy Storage Device" to the electrical energy generator only when it has reached a prescribed threshold for its efficient conversion to electrical energy, which can only be achieved when enough mechanical energy is available for conversion to electrical energy to efficiently operate the harvester generator.

As a result, if the railcar train is traveling even very slowly, mechanical energy is accumulated in the "Mechanical Energy Storage Device" until it reaches its threshold level over several railcar wheel passing, i.e., several rail vertical displacement cycles, before being transferred to the second stage of the "railway mechanical energy harvester" for efficient conversion to electrical energy.

When the railcar train is traveling at high speeds, the stored mechanical energy threshold is reached faster, and the second stage mechanism that transfers the stored mechanical energy to electrical generator would halt transfer of mechanical energy to the mechanical energy storage device of the first stage, allowing the required time to the electrical energy generator to efficiently convert the stored mechanical energy to electrical energy.

Figure 6:
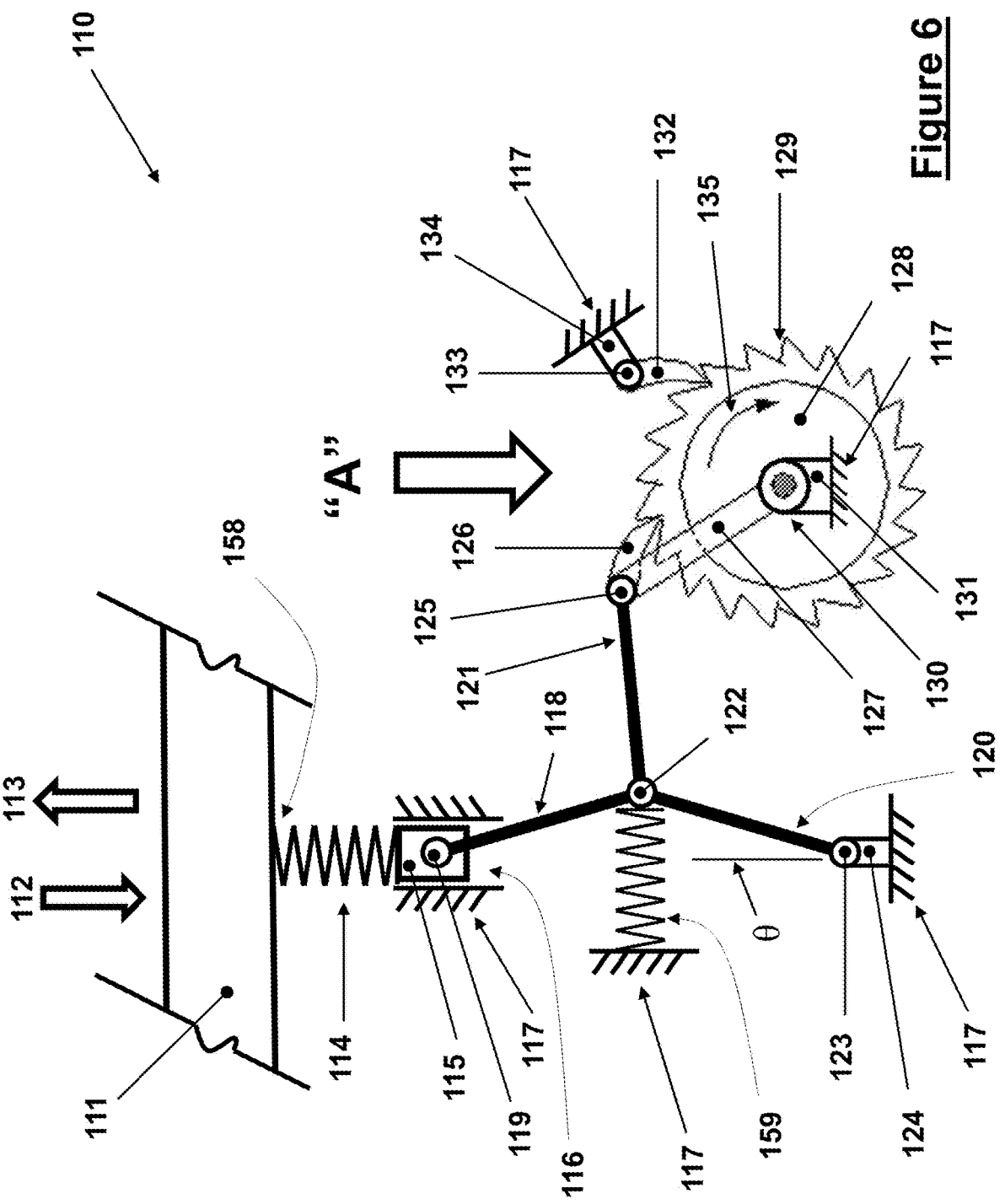
FIG. 6 illustrates the side view of the first "two-stage" "railway mechanical energy harvester" embodiment for generating electrical energy from vertical displacement of rails due to railcar wheel loading.
Figure 7:
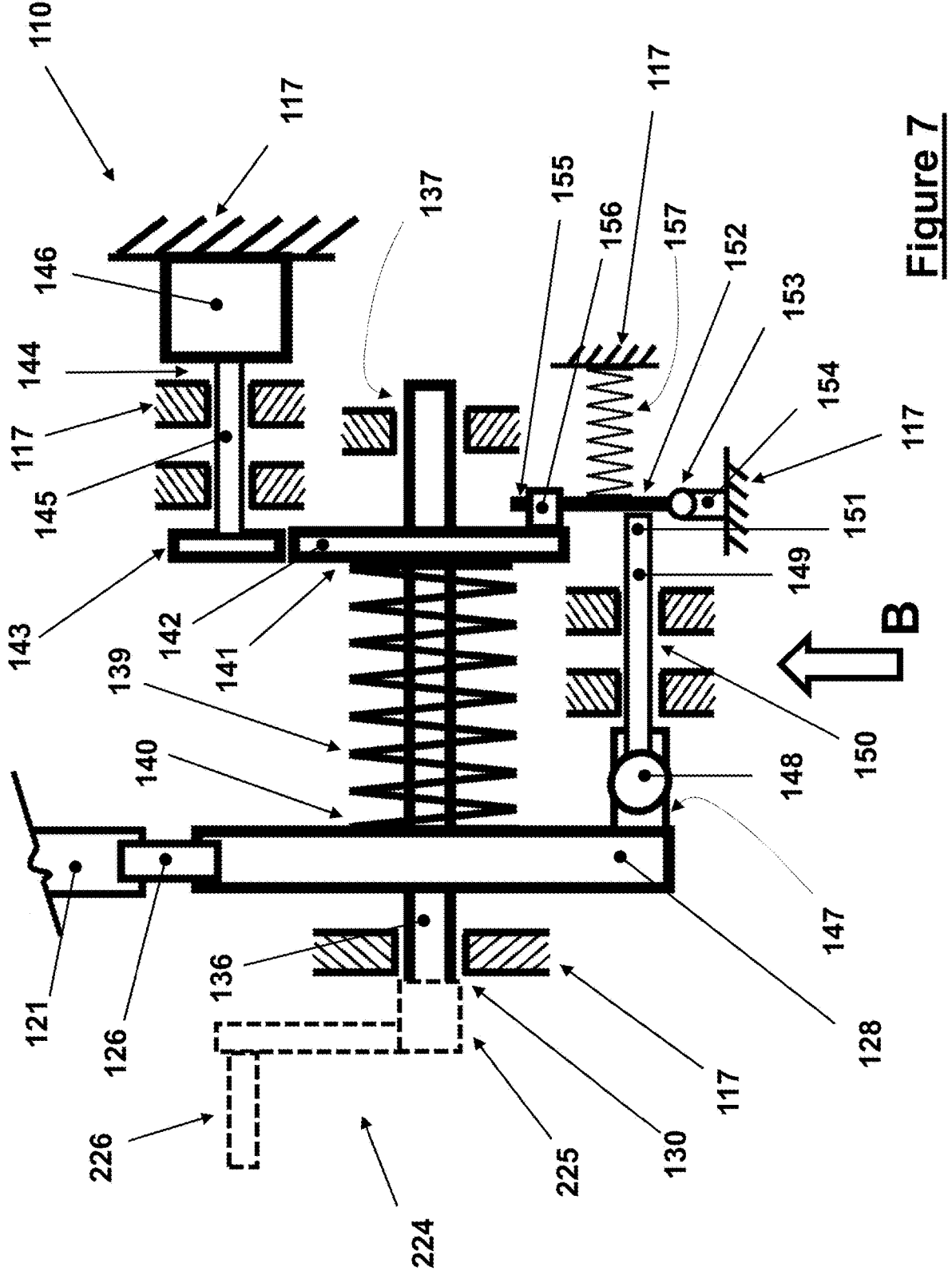
FIG. 7 illustrates the top view "A" of the side view of the embodiment of FIG. 6 of the first "two-stage" "railway mechanical energy harvester" embodiment for generating electrical energy from vertical displacement of rails due to railcar wheel loading.

The development of a "two-stage" "railway mechanical energy harvester" for generating electrical energy from vertical displacement of rails due to railcar wheel loading using the above method as shown in the block diagram of FIG. 5 is herein described by an example of such a harvester design shown in the schematics of FIGS. 6 and 7.

FIG. 6 illustrates the side view of the first "two-stage" "railway mechanical energy harvester" embodiment 110 for generating electrical energy from vertical displacement of rails due to railcar wheel loading. The top view "A", FIG. 6, is shown in FIG. 7.

In the schematic of FIG. 6, the section of the railway (or tie) under which the "two-stage" "railway mechanical energy harvester" embodiment 110 is mounted is indicated by the numeral 111. The section 111 of the railway would then be displaced (vertically) in the direction of the arrow 112 under a railcar (not shown) loading, after which the section would return to its initial state, i.e., displace back to its initial position in the direction of the arrow 113.

As can be seen in the side view of FIG. 6 of the "two-stage" "railway mechanical energy harvester" embodiment 110, the harvester consists of a compressive spring 114. Which is fixedly attached to the bottom of the rail (or tie) on one end and to the slider block 115 on the other end as shown in FIG. 6. The slider block is free to move in the vertical direction as viewed in the plane of FIG. 6 in the guide 116 provided in the structure 117 of the "two-stage" "railway mechanical energy harvester" 110. A link 118 is then attached to the slider block 115 via the rotary joint 119 on one end and to the links 120 and 121 on the other end via the common rotary joint 122. The other end of the link 120 is then attached to the rotary joint 123, which is fixedly attached to the structure 117 of the "two-stage" "railway mechanical energy harvester" via the support element 124. The structure 117 of the "two-stage" "railway mechanical energy harvester" is considered to be mounted on firm ground under the support structure of the railway.

A preloaded tensile spring 159, which is attached to the joint 122 on one end and to the structure 117 of the "two-stage" "railway mechanical energy harvester" on the other end is provided to keep the compressive spring 114 preloaded and keep the links 118 and 120 in the configuration shown in FIG. 6. A stop (not shown) may also be provided to keep the angle $\theta$ at a desired minimum angle and the preloading of the compressive spring at the desired level.

As can be seen in FIG. 6, the links 118 and 120 of the "two-stage" "railway mechanical energy harvester" embodiment 110 can be configured to be equal or close to equal in length and make a relatively small an angle $\theta$ (around 5-10 degrees) with the vertical direction in the rest position of the mechanism, i.e., without any vertical displacement of the rail 111. As a result, as the slider block 115 is displaced downward due to the downward displacement of the rail 111 (in the direction of the arrow 112) as described later in this disclosure, the joint 122 is displaced to the right a significantly larger distance, i.e., the input displacement (downward displacement of the slider block 115) is amplified.

For example, if the length of the links 118 and 120 is 0.3 meter and the initial angle $\theta$ is 5 degrees, then a 10 mm downward (in the direction of the arrow 112) displacement of the slider block 115 would result in a rightward displacement of the rotary joint 122 by around 55 mm, i.e., the input displacement is amplified by a factor of 5.5. Even if the initial angle $\theta$ is set at 10 degrees, the rotary joint 122 would still have a rightward displacement of around 40 mm, i.e., the input displacement is still amplified by a factor of around 4.

As can be seen in the schematic of FIG. 6, a link 121 is then attached on one end to the joint 122 and on the other end to the pawl 126 via the rotary joint 125. The pawl 126 is also attached to the link 121 and the link 127 of the rachet 128 via the rotary joint 125. The pawl 126 is biased in the clockwise rotation as viewed in the plane of FIG. 6 by preloaded torsion springs (not shown) to keep it in contact with the teeth 129 of the ratchet 128. The other end of the ratchet link 127 is attached to the rotary joint 130 of the ratchet 128, which is fixedly attached to the structure 117 of the "two-stage" "railway mechanical energy harvester" 110 via the support 131.

It is appreciated that ratchet mechanisms are well known in the art and in the present mechanism, as it will be described below, the aforementioned rightward displacement of the rotary joint 122 causes the link 121 to rotate the ratchet link 127 in the clockwise direction, which would cause the ratchet 128 to be rotated in the clockwise direction as shown by the arrow 135. Then as the ratchet link 127 is rotated back in the counterclockwise direction as the link 121 retreats as described below, then the pawl 132 is provided to prevent counterclockwise rotation of the ratchet 128. The pawl 132 is attached to the rotary joint 133, which is attached to support member 134, which is fixedly attached to the structure 117 of the "two-stage" "railway mechanical energy harvester" 110. The pawl 132 is biased in the clockwise rotation as viewed in the plane of FIG. 6 by preloaded torsion springs (not shown) to keep it in contact with the teeth 129 of the ratchet 128.

The top view "A" of FIG. 6 of the "two-stage" "railway mechanical energy harvester" embodiment 110 is shown in FIG. 7. As can be seen in the schematic of FIG. 7, the ratchet 128 is attached to the harvester structure 117 by the shaft 136, to which it is fixedly attached. The shaft 136 is also supported by the rotary joints 137 on its rightmost end.

A torsion spring 139 is then provided as can be seen in FIG. 7, which is fixedly attached to the face of the ratchet 128 on one end 140 and to the face of the gear 142 on the other end 141. The gear 142 is free to rotate over the shaft 136. The gear 142 is engaged with the pinion 143, which is fixedly attached to the shaft 145 of the electrical generator 146. The gear 142 can be configured to also act as a flywheel. The shaft 145 is mounted in the bearings 144 in the structure 117 of the "two-stage" "railway mechanical energy harvester" 110 as can be seen in the schematic of FIG. 7. The electrical generator may be of any appropriate type well known in the art and may be provided with commonly used electronics to regulate the generated (AC) current, for example to convert it to a regulated DC current for charging a provided rechargeable battery or super-capacitor or be used directly to power an electrical or electronic load.

Figure 8:
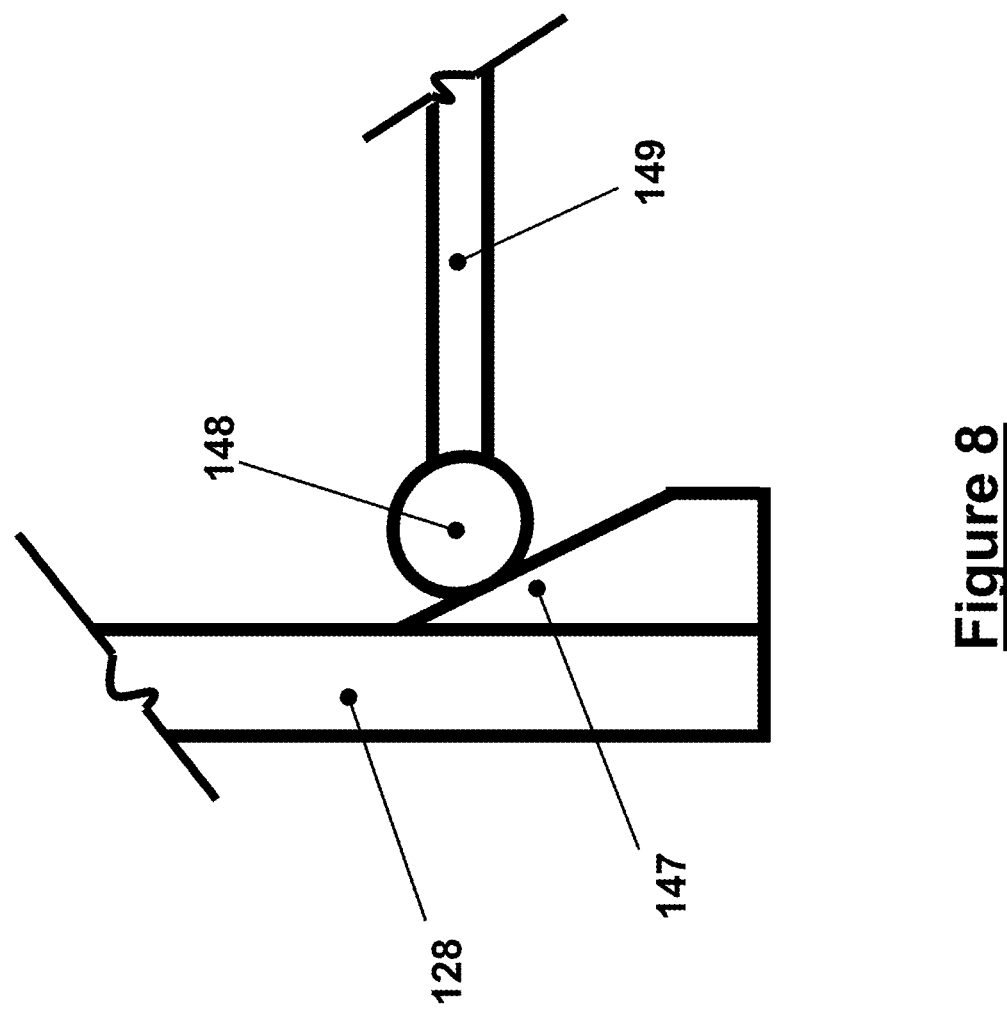
FIG. 8 illustrates a section of the side view "B" of FIG. 7 of the first "two-stage" "railway mechanical energy harvester" embodiment of FIG. 6 showing the inclined surface of the ratchet member that actuates the gear release mechanism.

As can be seen in the top view of FIG. 7, the ratchet 128 is also provided with a sloped member 147, which is shown more clearly in the side view "B" in FIG. 8. The sloped section of the member 147, following clockwise rotation of the ratchet 128 (as viewed in the plane of FIG. 6) would engage the end piece 148 of the sliding link 149 and as is described later in this disclosure, and cause the sliding link 149 to be displaced to the right. The sliding link 149 is free to slide in the sliding bearings 150 provided in the structure 117 of the "two-stage" "railway mechanical energy harvester" 110 as can be seen in the schematic of FIG. 7.

The end 151 of the sliding link 149 in normally in contact with the link 152, which is attached to the structure 117 of the "two-stage" "railway mechanical energy harvester" 110 by the rotary joint 153 via the support member 154. In the configuration shown in FIG. 7, the tip 155 of the link 152 is seen to be positioned under the stop member 156 of the gear 142, which would prevent clockwise rotation of the gear (as viewed in the plane of FIG. 6) as the torsion spring 139 is wound as described later in this disclosure. The link 152 is biased against a stop (not shown for the sake of clarity) that limits its further counterclockwise rotation as viewed in the plane of FIG. 7 by the preloaded compressive spring 157, which is positioned against the link 152 on one end and the structure 117 of the "two-stage" "railway mechanical energy harvester" 110 on the other end.

The "two-stage" "railway mechanical energy harvester" embodiment 110 operates as follows. As the railcar loading of the rail (tie) displaces the rail section 111 downward (in the vertical direction from the ground surface) in the direction of the arrow 112, FIG. 6, the top end 158 of the compressive spring 114 is displaced the same amount downward. The function of the compressive spring 114 is to limit the rate of transfer of the rail 111 displacement/force in the direction of the arrow 112 to the slider block 115, i.e., minimize input jerk to the "Mechanical Energy Transfer Mechanism" of the harvester, such as when the railcar is traveling at high speeds. It is noted that in the "two-stage" "railway mechanical energy harvester" 110, the components of the system shown in the schematic of FIG. 6 comprise an exemplary "Mechanical Energy Transfer Mechanism" of the harvester as shown in the block diagram of FIG. 5.

It is noted that the compressive spring 114 can be configured to have a nonlinear spring rate, such that it would initially exhibit a lower spring rate with its spring rate increasing with increased compressive deformation, such as at high railcar speeds, the downward acceleration of the slider block is limited and its rate (i.e., its jerk) is controlled. In addition, the preloading level of the compressive spring 114 is set such that spring would begin to displace the slider block 115 as the railcar wheel load begins to displace the rail 111 downward.

It is also appreciated by those skilled in the art, that even though the links 118, 120 and 121 and other components of the mechanisms of FIGS. 6 and 7 are considered to be relatively rigid, their actual flexibility, no matter how small, does affect the dynamics of the "two-stage" "railway mechanical energy harvester" embodiment 110, such as when the passing railcar is fully loaded and travels at relatively high speed, and must be considered when designing the harvested system.

As the railcar loading of the rail (tie) displaces the rail section 111 downward in the direction of the arrow 112, FIG. 6, the compressive spring 114 begins to displace the slide block 115 down, causing the link 120 (118) to begin to rotate in the clockwise (counterclockwise) direction and forcing the joint 122 to be displaced towards the right as seen in the view of FIG. 6 a distance that is several times larger than the downward displacement of the slider block 155, depending on the angle θ at that instant as was previously described. The rightward displacement of the joint 122 will then force the link 121 to rotate the ratchet link 127 in the clockwise direction, thereby causing the ratchet 128 to be rotated in the clockwise direction that may be one or more teeth 129 depending on the amount of clockwise rotation of the ratchet link 127. Then as the rail 111 returns to its initial position shown in FIG. 6 following the passing of the railway wheel over the railway section, the slider block is returned to its initial position by the pulling force of the preloaded tensile spring 159 and the ratchet link 127 is rotated back in the counterclockwise direction together with the pawl 126, while the pawl 132 prevents the ratchet 128 to rotate in the counterclockwise direction and back to its starting position.

Then as can be seen in the schematic top view of "two-stage" "railway mechanical energy harvester" embodiment 110 of FIG. 7, the clockwise rotation of the ratchet 128 would cause the torsion spring 139 to be wound since at the illustrated configuration of the harvester 110 shown in this illustration, the gear 142 is prevented from undergoing clockwise rotation, i.e., in the same direction as the ratchet 128 as viewed in the plane of FIG. 6, by the positioning of the tip 155 of the link 152 being positioned under the stop member 156.

It is appreciated that the above-described process of operation of the "Mechanical Energy Transfer Mechanism" of the "two-stage" "railway mechanical energy harvester" embodiment 110 of FIGS. 6 and 7 would thereby transfer mechanical potential energy from the vertical displacement of the rail (tie) section 111 under railcar wheel loading to the torsion spring 139, which acts as the "Mechanical Energy Storage Device, FIG. 5, for storage.

It is appreciated that as more railcar wheels pass over the rail (tie) section 111, FIG. 6, to ratchet 128 continues to be rotated as described above in the clockwise direction and more mechanical potential energy is stored in the torsion spring 139. Then eventually the sloped member 147 of the ratchet 128 is positioned above the end piece 148 of the link 149 and begins to force it and the link 149 to be displaced to the right as viewed in the plane of FIG. 7. The end 151 of the link 149 would then begin to force the link 152 to begin to rotate in the clockwise direction as viewed in the plane of FIG. 7. Then at some point the end 155 of the link 152 would clear the stop member 156 of the gear 142 (corresponding to the point at which the level of stored mechanical energy having reached its prescribed threshold as indicated in the block diagram of FIG. 5), thereby freeing the gear 142 to begin to be rotate in the clockwise direction as would be viewed in the plane of FIG. 5 by the loaded torsion spring 139, thereby allowing the mechanical potential energy stored in the torsion spring 139 to be transferred to the electrical generator 146 via the gear 142 engaged pinion 143. The latter components of the "two-stage" "railway mechanical energy harvester" embodiment 110 comprise an exemplary "Mechanism to Transfer Stored Mechanical Energy to Electrical Generator" indicated in the block diagram of FIG. 5. In general, the gear ratio of the gear 142 and pinion 143 can be high enough (such as over 3-5) depending on the type and characteristics of the electrical generator 146 to achieve efficient conversion of the stored mechanical energy to electrical energy.

It is appreciated by those skilled in the art that the length of the sloped member 147 of the ratchet 128 may be configured long enough to allow enough time for the mechanical potential energy stored in the torsion spring 139 to be transferred to the generator 149 for conversion to electrical energy before the tip 155 of the link 152 would reengage the stop member 156.

It is appreciated that the above-described "Mechanism to Transfer Stored Mechanical energy to Electrical Generator" and the "Electrical Energy Generator" components of the "two-stage" "railway mechanical energy harvester" embodiment 110 of FIGS. 6 and 7 comprise an exemplary second stage of the harvester.

It is appreciated by those skilled in the art that the exemplary configuration of the "two-stage" "railway mechanical energy harvester" embodiment 110 allows for very rapid transfer of mechanical energy from the vertical displacement of the rail 111 due to railcar wheel loading to the mechanical energy storage component of the harvester, i.e., for storage as mechanical potential energy in the torsion spring 139, FIG. 7, in the first stage of the harvester, for later conversion to electrical energy. Such configuration can be useful when a fully loaded railcar passes the harvester rail section at very high speed at which the mechanical energy cannot be efficiently "received" due to the dynamic forces due to the inertia of the various components of the harvester. In addition, the received mechanical energy cannot be converted directly to electrical energy in the very short durations of the mechanical energy inputs ("pulses").

However, in the exemplary configuration of the "two-stage" "railway mechanical energy harvester" embodiment 110, the "Mechanical Energy Transfer Mechanism" of the "first stage" can be configured with high dynamic response characteristics (i.e., low equivalent inertia) to "receive" the available mechanical energy from railcar wheel loading of high-speed trains and store it in the "Mechanical Energy Storage Device" of the "first stage" of the harvester, FIGS. 5-7. The stored mechanical energy, once it has reached a prescribed threshold level, is converted to electrical energy efficiently over a significantly longer period of time in the "second stage" of the "two-stage" "railway mechanical energy harvester".

In addition, if the railcar train is traveling at even very low speed, then the "Mechanical Energy Transfer Mechanism"

of the "two-stage" "railway mechanical energy harvester" embodiment 110 would keep on transferring mechanical energy to the "first stage" "Mechanical Energy Storage Device" until the prescribed mechanical energy threshold level is reached. At which time, the stored mechanical energy is released for conversion to electrical energy with the same efficiency.

As a result, the "two-stage" "railway mechanical energy harvester" embodiment 110 would operate efficiently independent of the speed of the passing railcar train.

It is appreciated that as can be seen in the schematic of FIG. 7, the sloped member 147 provided on the ratchet 128 would actuate the sliding link 149 to release the gear 142 and transfer the stored mechanical potential energy to the electrical generator every full rotation of the ratchet wheel. However, if desired, more than one such sloped members 147 may be similarly provided on the same surface of the ratchet 128 to release the stored mechanical energy for conversion to electrical energy more than once during one full rotation of the ratchet 128.

Figure 9:
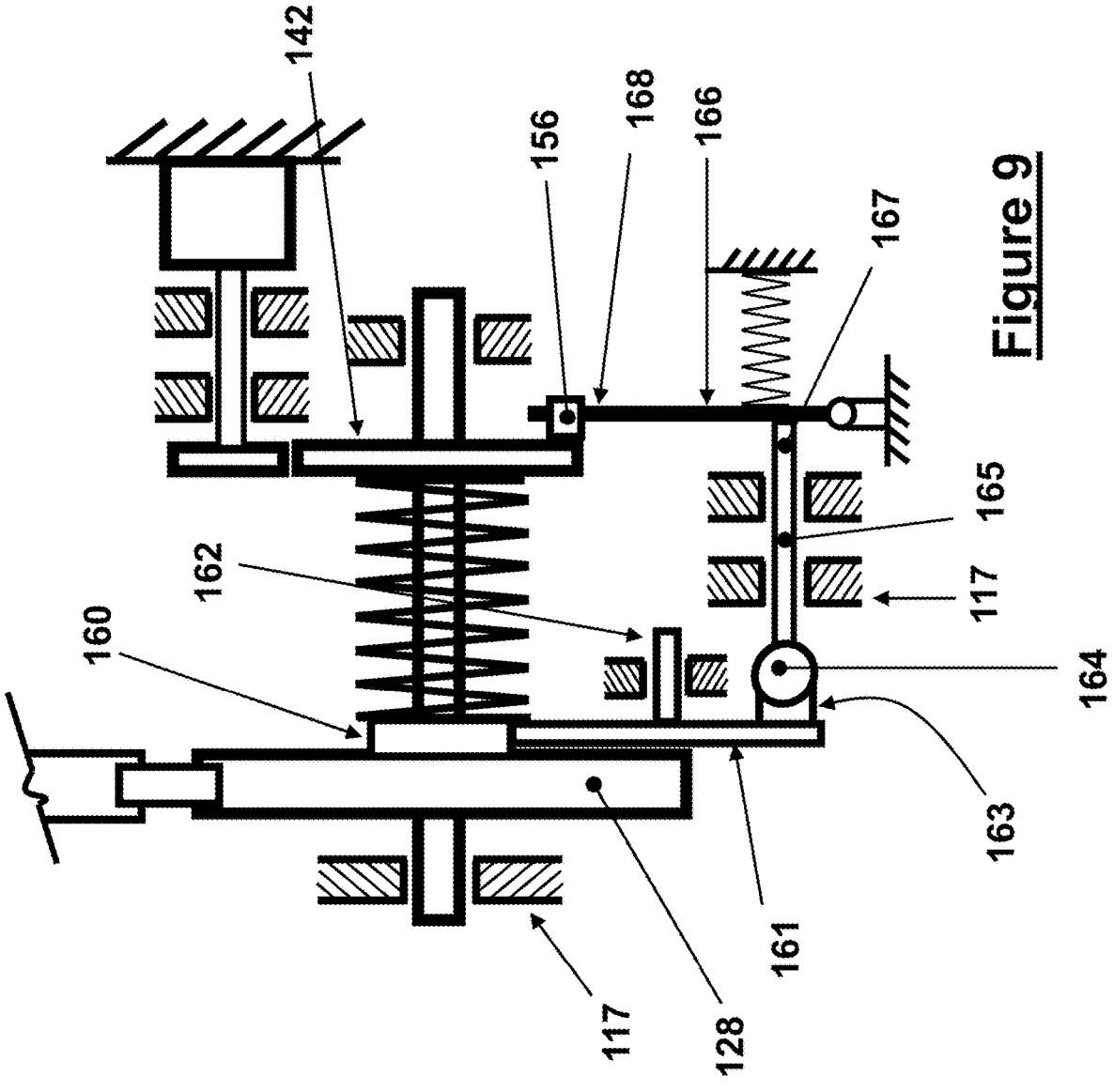
FIG. 9 illustrates an alternative embodiment of the "two-stage" "railway mechanical energy harvester" embodiment of FIGS. 6-7 to increase the amount of mechanical potential energy that can be stored in the Mechanical Energy Storage Device of the harvester.

Alternatively, the ratchet 128 may be provided with a fixedly attached pinion 160, which engages with the gear 161, which rotates about shaft 162, as shown in the schematic of FIG. 9. All components of this modified embodiment are identical to those of the embodiment of FIGS. 6-7 except those described below.

In this modified embodiment of the "two-stage" "railway mechanical energy harvester" embodiment 110, the sloped members 163 (147 in FIG. 7) is now provided on the surface of the gear 161 as shown in FIG. 9. The end piece 164 (148 in FIG. 7) of the sliding link 165 (149 in FIG. 7) can similarly engage the sloped members 163 to force the sliding link 165 to be displaced to the right as viewed in the plane of FIG. 9. Then as the sliding link 165 is displaced to the right, its end 167 would similarly force the link 166 (152 in FIG. 7) to rotate in the clockwise direction, thereby allowing its tip 168 (155 in FIG. 7) to disengage the end 168 (155 in FIG. 7) of the link 166, thereby releasing the gear 142 and allowing the stored mechanical energy to be transferred to the electrical generator as was previously described.

In the schematic of FIG. 7, a torsion spring is shown to be used for storing the transferred mechanical energy in the "Mechanical Energy Storage Device", FIG. 5, of the "two-stage" "railway mechanical energy harvester" embodiment 110. It is appreciated by those skilled in the art that instead of the torsion spring, one or more power springs (also known as clock spring) may also be used. The power springs generally have the advantage of occupying a significantly shorter length along their winding shaft (shaft 136 in FIG. 7) for storing the same amount of mechanical potential energy over larger number of shaft (ratchet 128) turns and with lower winding torque level. For these reasons, power springs can be more substituted in the construction of the disclosed "two-stage" "railway mechanical energy harvester" embodiments and may yield a more compact harvester unit.

It is also appreciated by those skilled in the art that numerous other mechanisms may be used for the release of the gear 142 once the prescribed mechanical potential energy has been stored in the torsion spring 139 and that the present mechanism is provided only as an example of such a release mechanism.

Figure 10:
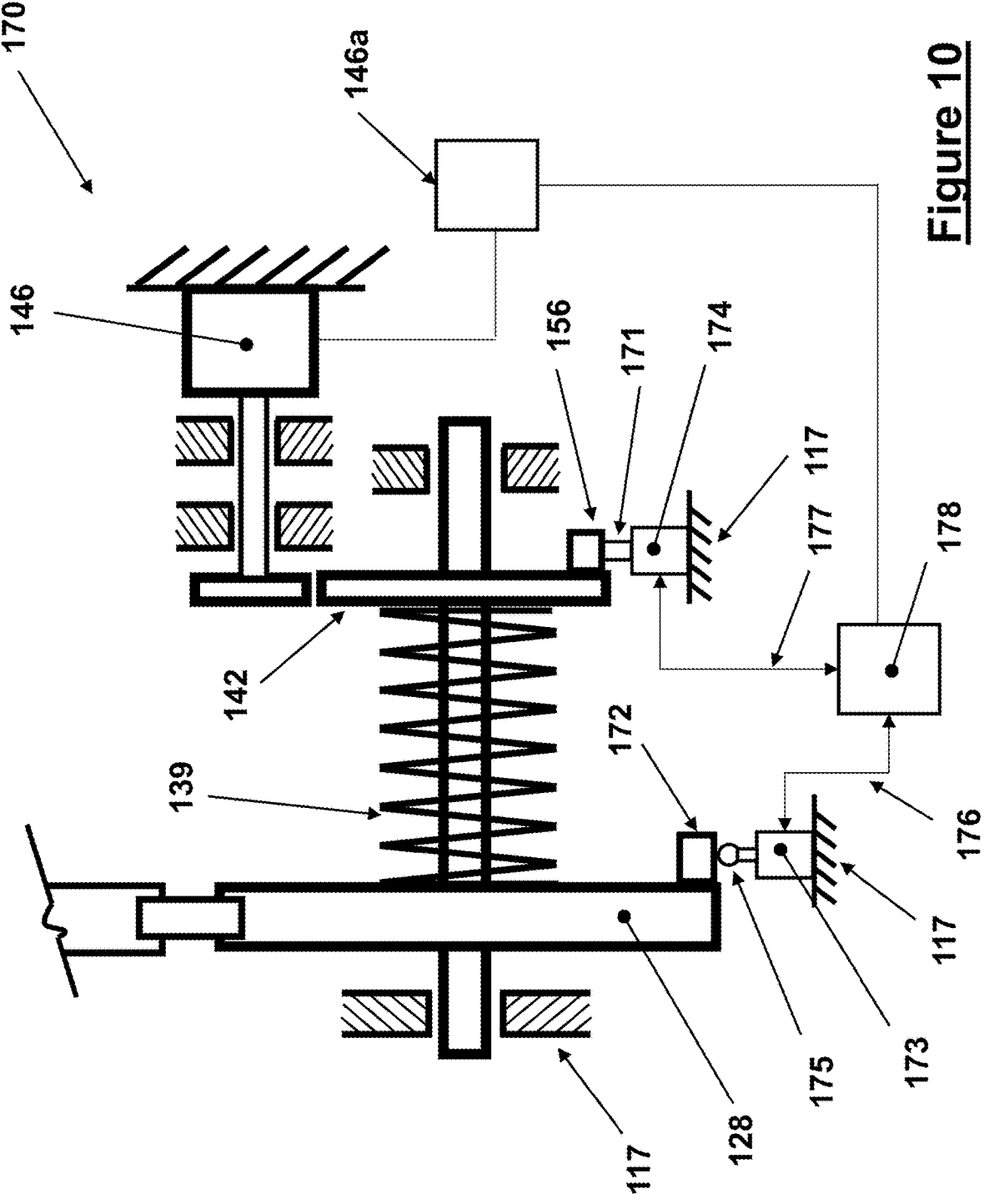
FIG. 10 illustrates the side view of a modified "two-stage" "railway mechanical energy harvester" embodiment of FIGS. 6-7 that is provided with electrical solenoid and controls for releasing stored mechanical energy for conversion to electrical energy.

It is also appreciated by those skilled in the art that the mechanical gear 142 release mechanism, i.e., the sliding link 149 and the link 152 and their related components, may be replaced by an electrical solenoid that retracts to release the gear 142 and that is energized by a provided microswitch actuated by a provided member on the ratchet 128. Such an arrangement is shown in FIG. 10 (indicated as the embodiment 170) for the "two-stage" "railway mechanical energy harvester" embodiment 110 of FIGS. 6-7 and may be similarly implemented on the modified embodiment of FIG. 9. It is appreciated that the electrical energy generated by the harvester and generally stored at least partially in accompanying electrical energy storage devices such as rechargeable batteries and/or capacitors or super-capacitors can be used to power and actuate the provided solenoid.

As can be seen in the schematic of FIG. 10, all components of the "two-stage" "railway mechanical energy harvester" embodiment 170 are identical to those of the embodiment 110 of FIGS. 6-7, except for the aforementioned removal of mechanical gear 142 release mechanism of the harvester and their replacement by an electrical solenoid-based release mechanism. In this embodiment, as mechanical energy is being transferred and stored in the torsion spring 139 by clockwise rotation of the ratchet 128 as was previously described, clockwise rotation of the gear 142 is prevented by the member 171, which is attached to the sliding member of the electrical solenoid 174. Here, the member 171 is positioned under the stop member 156 of the gear 142 and is pulled back from under the stop member 156 when the actuating solenoid 174 is energized by the control unit 178 via the line 177, which can be powered by the harvester generated and stored electrical energy unit 146a. The signal for energizing the solenoid 174 is provided by a sensor 173 for detecting the presence of the member 172 (replacing the sloped member 147 in FIG. 7 or 163 in FIG. 9), which is fixedly attached to the ratchet 128. The sensor 173 may also be powered from the stored electrical energy unit 146a and can be a microswitch with the contacting member 175 or may be proximity switch or optical switch or the like known in the art and sends its detection signal to the control unit 178 via the line 176.

It is appreciated by those skilled in the art that when the sensor 173 is a proximity or optical switch, then instead of using the member 172, the teeth 129 (FIG. 6) of the ratchet may be used instead and the control unit can count the number of teeth that passes the sensor to determine when the ratchet 128 has completed its prescribed clockwise rotation for the gear 142 to be released by the electrical solenoid actuation as previously described.

Figure 11:
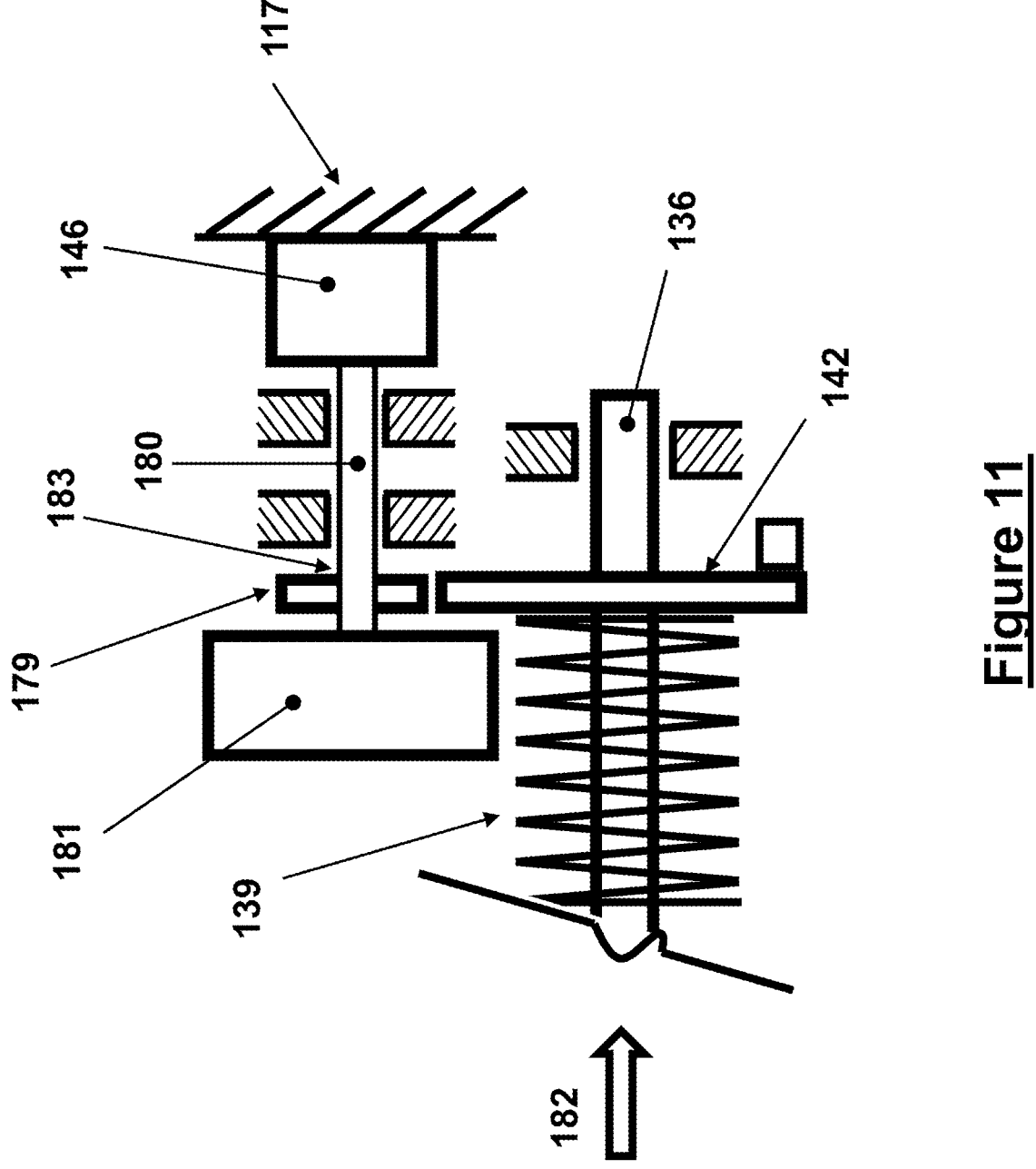
FIG. 11 illustrates a modified mechanism arrangement for transferring stored mechanical energy to electrical energy generator for conversion to electrical energy for the embodiments of FIGS. 6-7 and 9 and 10.

It is appreciated that in the embodiments of FIGS. 6-7, 9 and 10, the mechanical potential energy stored in the torsion spring 139 is transferred to the gear 142 (which also function as a flywheel with the provided moment of inertial) and then transferred to the generator 146 via the pinion 143, FIG. 7. Alternatively, a flywheel 181 may be provided on the shaft 145 of the pinion 143 and generator 146 as shown in FIG. 11, so that the gear 142 could rapidly transfer the stored mechanical potential energy to the flywheel and pinion and generator assembly for conversion to electrical energy while more mechanical potential energy is being accumulated in the torsion (or power) spring 139. This modified embodiment of the embodiments of FIGS. 6-7 and 9 and 10 can harvest larger amounts of mechanical energy from passing railcar wheel loading, such as at higher train speeds. In the schematic of FIG. 11, gear 142 to generator 146 section of the modified "two-stage" "railway mechanical energy harvester" embodiments of FIGS. 6-7, 9 and 10 are illustrated.

As can be seen in the schematic of FIG. 11, similar to the embodiments of FIGS. 6-7, the gear 142 is mounted on the shaft 136, over which it is free to rotate. The gear 142 is also engaged with the pinion 179 (143 in FIG. 7). However, unlike the embodiments of FIGS. 6-7, 9 and 10, the pinion 179 is mounted on the shaft 180 (144 in FIG. 7) by a one-way clutch 183 that allows for free counterclockwise rotation of the pinion over the shaft 180 as seen about the axis of the shaft 180 in the direction of the generator 146 but would transmit clockwise rotation of the gear 142 to the shaft 180 and thereby the flywheel and the generator. The shaft 180 is connected to the electrical generator 146 and a flywheel 181 is fixedly mounted on the shaft as can be seen in FIG. 11. It is appreciated that the one-way clutch 183 may be of any type, including those that are well known in the art.

When provided with the "Mechanism to Transfer Stored Mechanical Energy to Electrical Energy", FIG. 5, of the type shown in FIG. 11, the modified "two-stage" "railway mechanical energy harvester" embodiments of FIGS. 6-7, 9 and 10 would operate as follows. The mechanical energy is transferred from the vertical displacement of the rail 111 and stored in the torsion spring 139 and released when the prescribed level of mechanical potential energy is stored as was described for the above "two-stage" "railway mechanical energy harvester" embodiments. Once the gear 142 is released, it would start being rotated in the clockwise direction as viewed in the direction of the arrow 182, FIG. 11, which would in turn rotate the pinion 179 (143 in FIG. 7) in the counterclockwise direction as viewed in the direction of the arrow 182. The counterclockwise rotation of the pinion 179 is transmitted to the shaft 180 by the one-way clutch 183, thereby resulting in the mechanical potential energy stored in the torsion spring 139 to be transferred mostly to the flywheel 181 as kinetic energy while part of it being converted to electrical energy by the electrical generator 147 as was described for "two-stage" "railway mechanical energy harvester" embodiments of FIGS. 6-7, 9 and 10.

It is appreciated that once the stored mechanical energy has been transferred to the flywheel 181, the gear 142 and the pinion 179 would come to a stop, while the one-way clutch allows the shaft 180 to continue rotating unimpeded due to the presence of the one-way clutch 183. The kinetic energy stored in the flywheel 181 is then converted to electrical energy by the generator 146 over some time.

It is appreciated by those skilled in the art that one of the advantages of using the "Mechanism to Transfer Stored Mechanical Energy to Electrical Energy", FIG. 5, of the type shown in FIG. 11, in the modified "two-stage" "railway mechanical energy harvester" embodiments of FIGS. 6-7, 9 and 10 is that while the mechanical energy transferred to the flywheel 181 and generator 146 assembly, since the gear 142 is going to be rapidly locked (for example by the solenoid 174 actuation), the ratchet 128 can still be transferring more mechanical energy to the torsion spring 139 for storage as mechanical potential energy. This feature of these modified versions of the "two-stage" "railway mechanical energy harvester" embodiments of FIGS. 6-7, 9 and 10 can allow for a significantly larger amount of electrical energy to be harvested, such as from passing of trains travelling at high speeds. In addition, when the rotary speed of the flywheel 181 (as measured by the generator voltage or sensors that are well known in the art) exceeds certain prescribed threshold, the controller 178, FIG. 10, may delay storage of mechanical energy in the torsion spring 139 by not energizing the solenoid 174 to lock the gear 142.

Figure 12:
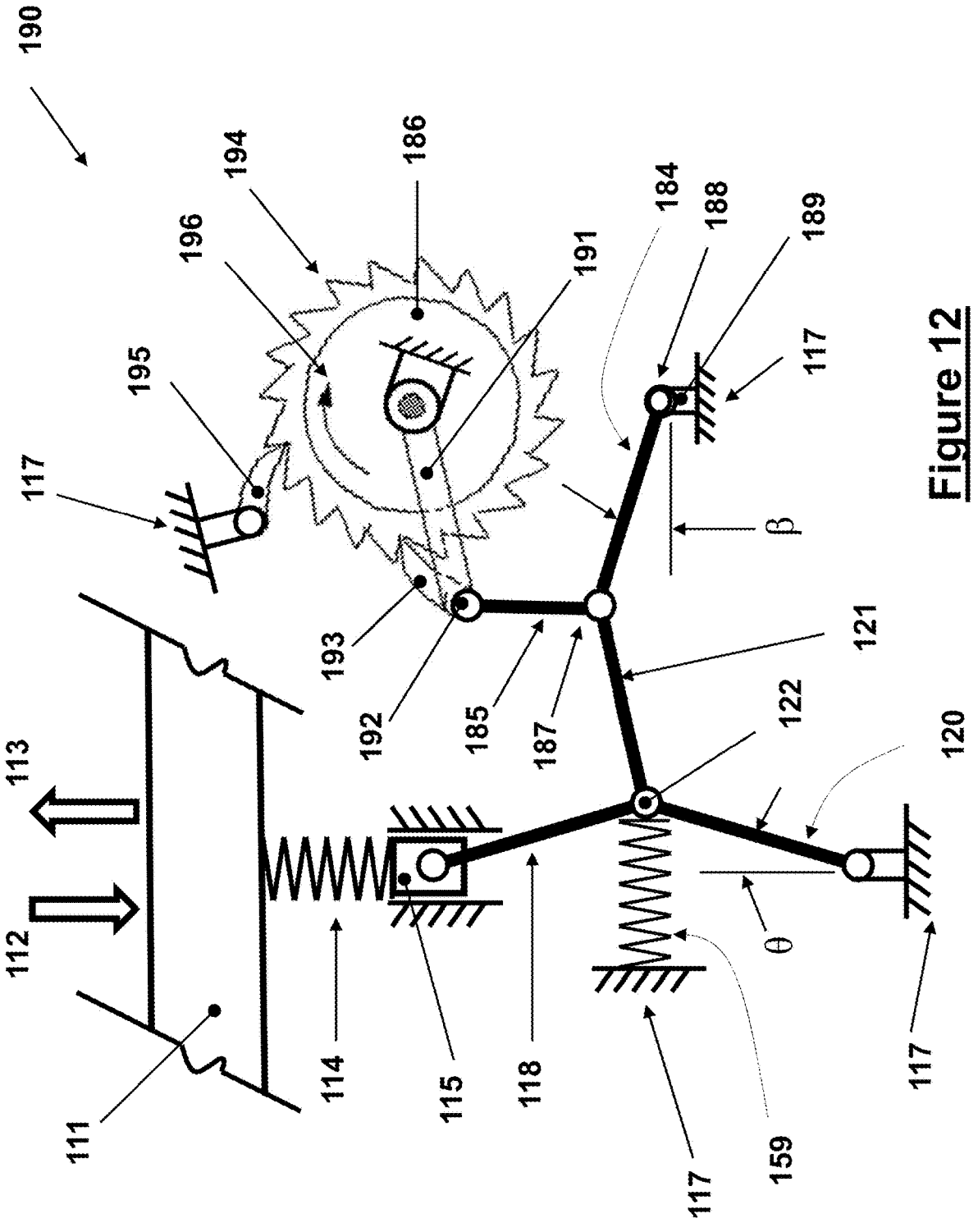
FIG. 12 illustrates the side view of another modified "two-stage" "railway mechanical energy harvester" embodiment of FIGS. 6-7 that is provided a significantly higher vertical rail displacement input amplification mechanism, such as for railway locations with higher structural rigidity and/or where railcar traffic is lightly loaded, such as in subways.

FIG. 12 illustrates the side view of another modified "two-stage" "railway mechanical energy harvester" embodiment of FIGS. 6-7, indicated as the embodiment 190 in FIG. 12, which is configured to provide significantly higher vertical rail displacement input amplification, such as for railway locations with higher structural rigidity and/or where railcar traffic is lightly loaded, such as in subways railways. It is appreciated by those skilled in the art that the modified input displacement amplification mechanism of FIG. 12 may also be used in the other embodiments of the "two-stage" "railway mechanical energy harvesters", including the embodiments of FIGS. 6-7, 9 and 10.

In the modified "two-stage" "railway mechanical energy harvester" embodiment 190 shown in the schematic of FIG. 12, all components of the harvester are identical to those of the embodiment 110 of FIGS. 6-7, except for the addition of the links 184 and 185 and slight repositioning of the ratchet 186 (128 in FIG. 6) assembly.

Similar to the links 118 and 120, the added links 184 and 121 can be equal in length. The added link 184 is attached on one end to the common rotary joint 187 to links 121 and 185 and to the structure 117 of the "two-stage" "railway mechanical energy harvester" 190 via the rotary joint 188 through the support member 189. In the rest configuration shown in FIG. 12, the links 121 and 184 also make a relatively small angle β with the line connecting the joints 122 and 188 (around 5-10 degrees, similar to the angle θ). The link 185, which is used to actuate the ratchet link 191 (127 in FIG. 6) is then attached to the rotary joint 187 on one end and to the rotary joint 192 connecting the ratchet link and the pawl 193 (126 in FIG. 6) on the other end.

The modified "two-stage" "railway mechanical energy harvester" embodiment 190 would then operate like the embodiment 110 of FIGS. 6-7 as follows. As the railcar loading of the rail (tie) displaces the rail section 111 downward in the direction of the arrow 112, FIG. 12, the pre-loaded compressive spring 114 forces the sliding block 115 to be displaced downward with minimal jerk as was previously described for the embodiment 110 of FIGS. 6-7. This would cause the link 120 (118) to begin to rotate in the clockwise (counterclockwise) direction, forcing the joint 122 to be similarly displaced towards the right as seen in the view of FIG. 12 a distance that is several times larger than the downward displacement of the slider block 155, depending on the angle θ at that instant as was previously described.

The rightward displacement of the joint 122 will then force the link 121 (184) to rotate in the counterclockwise (clockwise) direction, which would displace the joint 187 and thereby displace the link 185 upward as viewed in the plane of FIG. 12 an amplified amount, which would cause the ratchet link 191 (127 in FIG. 6) to rotate in the clockwise direction, thereby causing the ratchet 186 (128 in FIG. 6) to be rotated in the clockwise direction as indicated by the arrow 196 (135 in FIG. 6) that may be one or more teeth 194 (129 in FIG. 6) depending on the amount of clockwise rotation of the ratchet link 191. Then as the rail 111 returns to its initial position shown in FIG. 12 following the passing of the railway wheel over the railway section, the slider block 115 is returned to its initial position by the pulling force of the preloaded tensile spring 159 and the ratchet link 191 is rotated back in the counterclockwise direction together with the pawl 193, while the pawl 195 (132 in FIG. 6) prevents the ratchet 186 to rotate in the counterclockwise direction and back to its starting position.

It is appreciated by those skilled in the art that the added second displacement amplifying pair of links 121 and 184 would further amplify the input displacement of the slider block 115. The level of displacement amplification is dependent of the initial angle β as was previously described for the link pair 118 and 120 and the angle θ between the links and the line connecting their free non-connecting joints (which indicates the angular deviation of the link pair from one of their singular positionings as shown in FIG. 12). For example, as was indicated previously for displacement amplification factor of 4 for the link pair 118 and 120 with a starting angle of θ=10 degrees for the given link lengths, using similar link lengths and a starting angle β of 10 degrees, would result in an amplification factor of 16 (i.e., 4×4) for the input displacement of the slider block 115, thereby increasing the input rotation of the ratchet 186 by a factor of 4.

It is appreciated that the double input displacement amplification mechanism of the modified "two-stage" "railway mechanical energy harvester" embodiment 190 of FIG. 12 may generally be required for railway sections that are provided with relatively stiff foundations and/or where passing railcar are generally not fully loaded or are relatively lightweight, which could result in vertical displacement of the rail section (111 in FIG. 12) relatively small, for example, in the range of 8-10 mm and sometimes even lower. For such railway sections, "two-stage" "railway mechanical energy harvesters" of the configuration illustrated in the schematic of FIG. 12 are appropriate to be used. It is noted that as it was previously indicated, the support member 124, FIG. 6, of the link 120 at the structure 117 of the "two-stage" "railway mechanical energy harvester" is mounted on firm ground under the support structure of the railway section 111. In such applications, the starting angles θ and β, FIG. 12, of the input displacement linkage mechanisms can be set at less than aforementioned 10 degrees by adjusting the position of the previously indicated stop (not shown) that limits the starting position, FIGS. 6 and 12, of the angle θ. For example, by setting the angle θ and β to 5 degrees, the aforementioned input displacement application factor of 16 for 10 degrees angles is increased to around 30 (as previously described, an amplification factor of 5.5 for each amplification stage).

It is appreciated by those skilled in the art that the function of the pawl 195 of the embodiment of FIG. 12 (132 in FIG. 6) in preventing its torsion spring unwinding rotation in the counterclockwise direction (opposite to the direction of the arrow 196) may be similarly performed by a one-way clutch used to attach the ratchet 186 to its shaft (136 in FIG. 7) as is well practiced in the art.

It is appreciated by those skilled in the art that in certain applications, for example when the present "two-stage" "railway mechanical energy harvesters" are installed in tunnels, it is desirable to provide a manual way of operating the harvesters in case that the provided electrical energy storage devices of the harvester system may at some point run out of electrical energy due to very long assistance or repair times or the like. In the above disclosed embodiments, such manual operation option can be readily provided as shown for the embodiment 110 of FIGS. 6-7. The same method may be used for the other above "two-stage" "railway mechanical energy harvester" embodiments.

As can be seen in FIG. 7, a manually operated handle 224 (shown in dashed lines) is provided that the user can attach to the (left) end of the shaft 136 when needed. The attachment between the shaft 136 and the end 225 of the handle 224 may be a provided square or hexagonal mating parts that are commonly used in such handles and manual wrenches. Once the handle 224 is connected to the harvester shaft 136 as shown in FIG. 7, the user would then begin to rotate the handle by its hand 226 in the clockwise direction, which would then begin to wind the torsion spring 139 and release it once the previously indicated mechanical energy level has been stored in the torsion spring to generate electrical energy by the harvester generator.

Figure 6A:
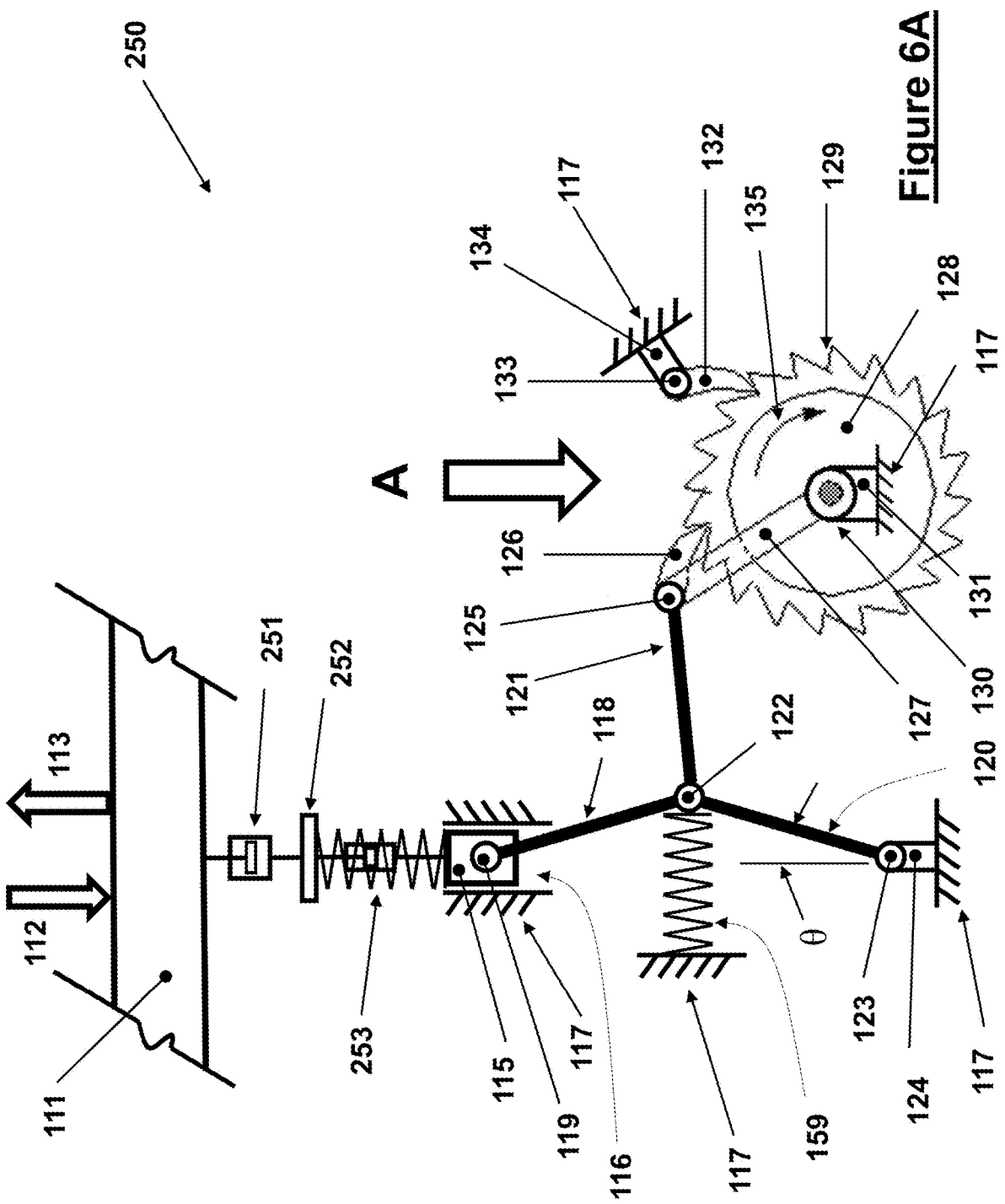
FIG. 6A illustrates the side view of a modified "two-stage" "railway mechanical energy harvester" embodiment of FIGS. 6-7 that is provided with a spring-damper system to rapidly and effectively transfer the available mechanical energy from vertical displacement of the rail/tie to the mechanical energy storage mechanism of the energy harvester.

FIG. 6A illustrates the side view of another modified "two-stage" "railway mechanical energy harvester" embodiment of FIGS. 6-7, indicated as the embodiment 250, which is configured to transfer a significantly larger portion of the available mechanical energy from the vertical rail displacement by the passing railway car. It is appreciated that the modification to the rail/tie section connecting spring (114 in FIG. 6) may also be used in other embodiments of the "two-stage" "railway mechanical energy harvesters".

In the modified "two-stage" "railway mechanical energy harvester" embodiment 250 shown in the side view schematic of FIG. 6A, all components of the harvester are identical to those of the embodiment 110 of FIGS. 6-7, except for the replacement of the connecting spring 114, FIG. 6, with the spring-damper system described below.

In the modified "two-stage" "railway mechanical energy harvester" embodiment 250 of FIG. 6A, the rail/tie connecting spring of the embodiment 110 of FIGS. 6-7 of the "Mechanical Energy Transfer Mechanism" is replaced by a serially connected one-way damper 251 and the parallel spring-damper unit 253, which may be connected by an interfacing plate 252. The spring and damper assembly is attached on one end to the slider block and on the other end to the rail/tie section as can be seen in the schematic of FIG. 6A. The damper of the parallel spring and damper assembly is a one-way type that provides a significantly more resistance to spring extension than its contraction.

The interfacing one-way damper 251 is configured to provide a significant resistance to contraction, thereby passing the downward rail/tie section 111 displacement to the interfacing plate 252 and thereby deforming the spring of the spring-damper assembly 253, while also displacing the slider block 155 downward, noting that the one-way damper of the spring-damper assembly 253 provides minimal resistance to its spring contraction. However, the one-way damper 251 is designed to extend as the rail/tie section 111 returns essentially freely to its initial position.

As a result, as the rail/tie section 111 returns to its initial position following the railcar wheel passing, the one-way damper of the spring-damper assembly prevents extension of the spring of the assembly back to its initial length, thereby releasing the mechanical potential energy that has been transferred to it by the vertical displacement of the rail/tie section due to railcar wheel loading. It is noted that as the rail/tie section 111 returns to its initial position, the one-way damper 251 freely extends, thereby allowing the spring of the spring-damper assembly 253 to essentially keep its deformed state and keep the transferred mechanical energy, less the mechanical energy that it has transferred to the "Mechanical Energy Transfer Mechanism" via the slider block 115. At this point, the one-way damper 251 resists contraction, thereby the spring of the spring-damper assembly 253 can then transfer its stored mechanical potential energy to the underlying mechanism over a time duration that is significantly longer than the input pulse from the rail/tie displacement.

It is noted that due to the very short duration of the rail/tie loading input, the instant equivalent inertia of the underlying mechanism would cause part of the input mechanical energy to be stored in the interfacing spring due to its significantly lower equivalent inertia. As a result, the duration of the input mechanical energy pulse into the "Mechanical Energy Transfer Mechanism" is significantly increased.

The "two-stage" "railway mechanical energy harvester" embodiment 250 of FIG. 6A operates as follows. As the railcar loading of the rail/tie displaces the rail section 111 downward in the direction of the arrow 112, the interfacing one-way damper 251, being highly resistant to contraction, would transmit the displacement to the interfacing spring-damper assembly 253. The spring-damper assembly 253 would then begin to displace the slider block 115 down, while the spring of the spring-damper assembly 253 would also begin to deform in compression due to the equivalent inertial of the downstream components of the "Mechanical Energy Transfer Mechanism", and stores part of the transferred mechanical energy as potential energy. The downward displacement of the slider block 115 could cause the ratchet link 127 and the ratchet 128 to begin to rotate in the clockwise direction and begin to wind the energy storage power spring 139, FIG. 7, as was described for the embodiment 110 of FIGS. 6-7. Then as the rail/tie section 111 returns to its initial position, the interfacing one-way damper 251 rapidly extends, while the one-way damper of the spring-damper assembly 253 resists its extension. The spring of the spring-damper assembly 253 would then force the slider block down further and begin to similarly transfer its stored mechanical energy to the power spring 139, FIG. 7.

Then as more railcar wheels pass over the rail/tie, the ratchet 128 continues to be rotated and more mechanical potential energy is stored in the torsion spring 139, FIGS. 6A and 7. Then eventually after the prescribed stored mechanical energy threshold level has been reached, i.e., after the ratchet 128 has rotated the prescribed amount, the gear 142 is released as was previously described for the embodiment 110 of FIGS. 6-7, thereby allowing the mechanical potential energy stored in the mechanical energy storage power spring 139 to be transferred to the generator 146.

Figure 1:
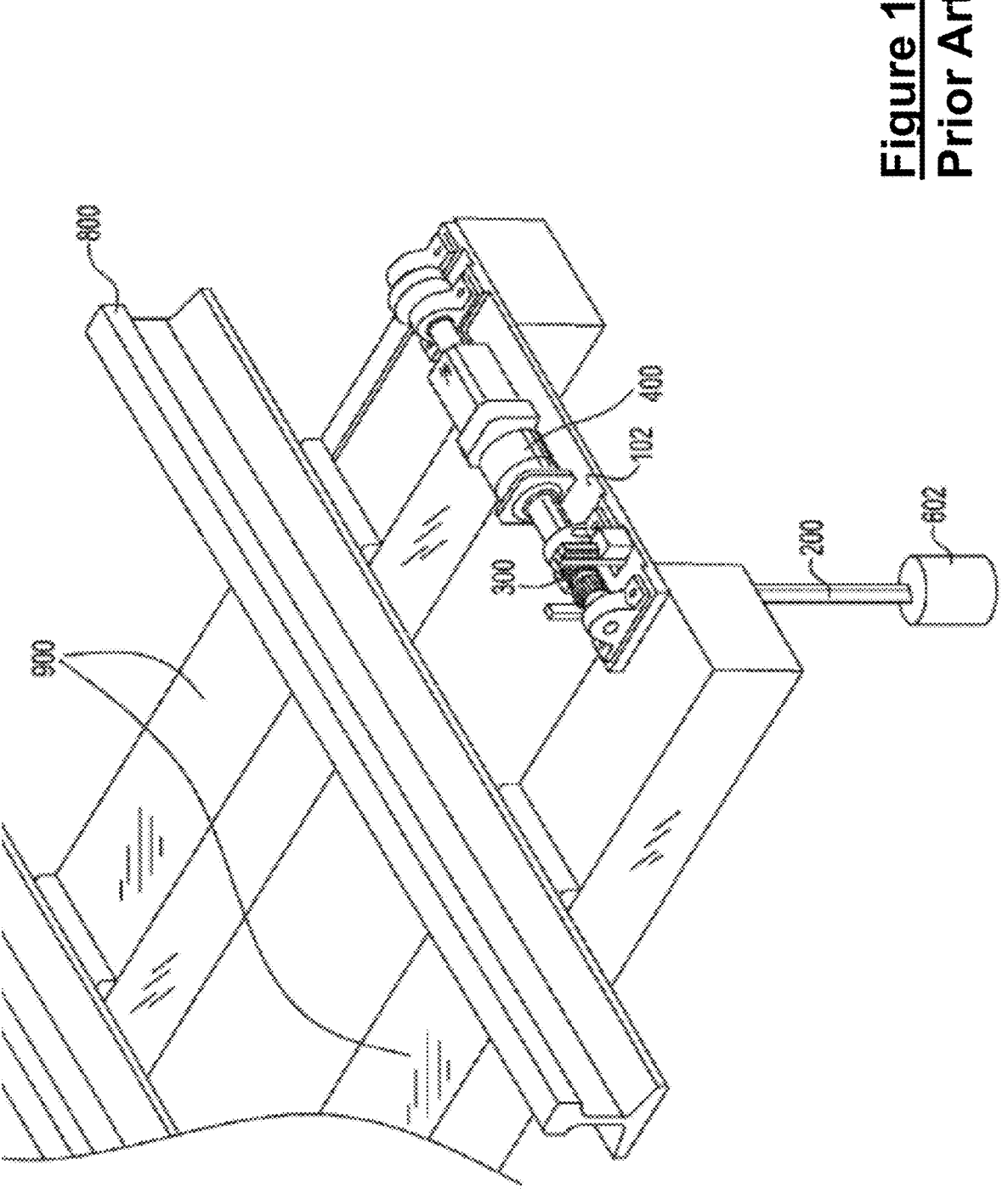
FIG. 1 illustrates one prior art rack-and-pinion based device for harvesting electrical energy from railway vertical displacement due to the passing train loading.
Figure 2:
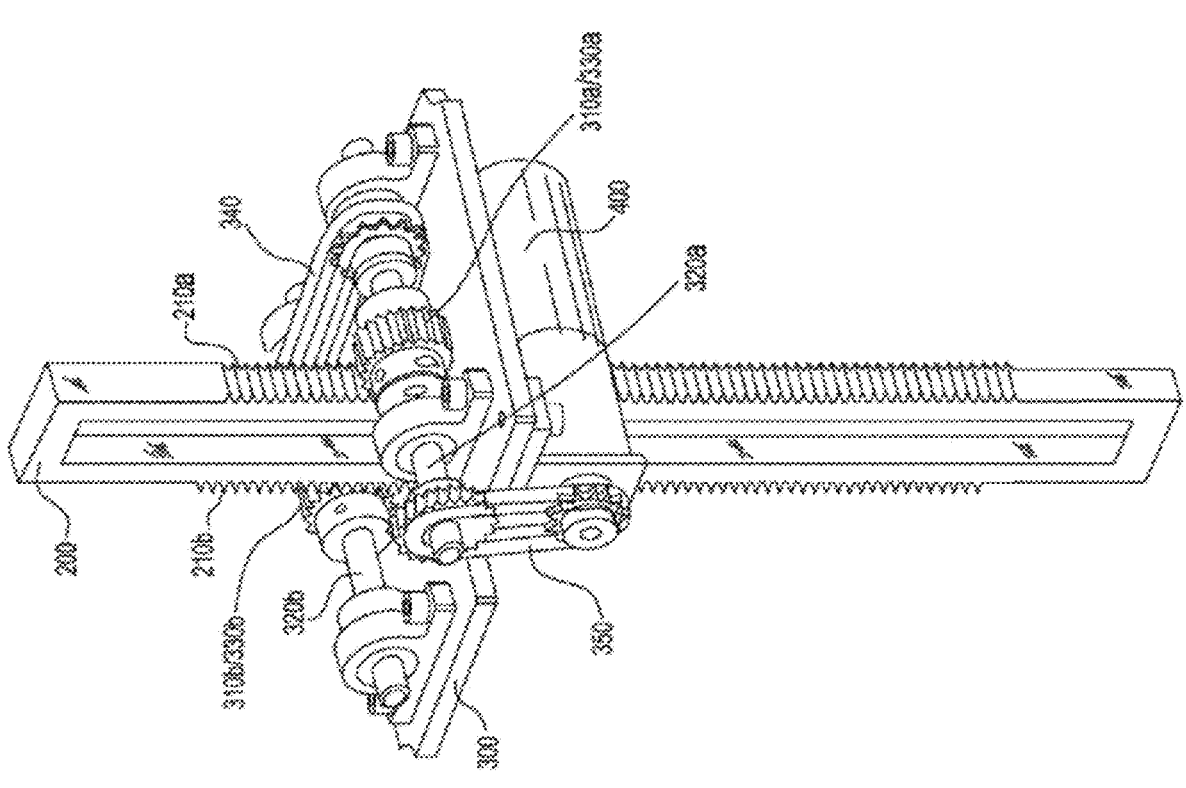
FIG. 2 illustrates another prior art rack-and-pinion based device for harvesting electrical energy from railway vertical displacement due to the passing train loading.
Figure 3:
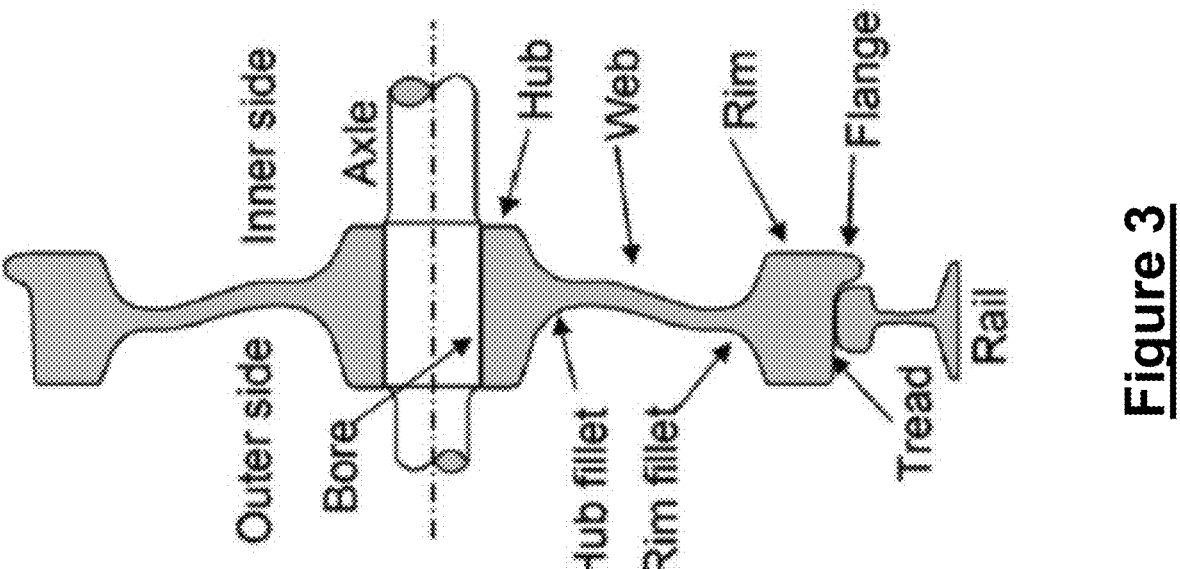
FIG. 3 illustrates the designations of each part of a solid railway train wheel.
Figure 4:
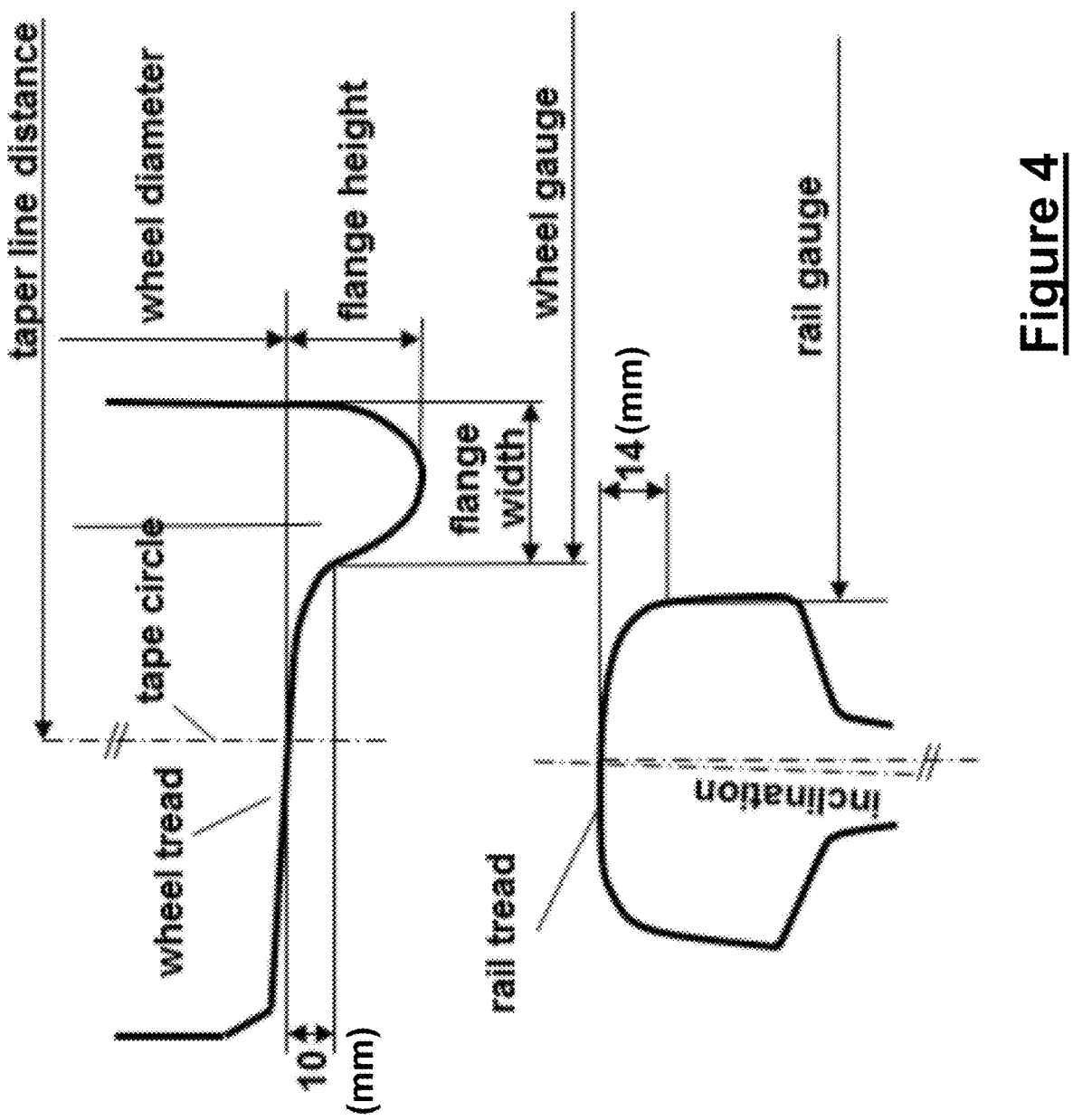
FIG. 4 illustrates a close-up cross-sectional view of the rail and wheel region and the nomenclature used for indicating different geometrical features (numbers in mm).

As it was previously indicated, mechanical energy may be transferred from the motion of the wheel flange, FIGS. 3 and 4, as it engages and actuates an appropriate mechanism, as well as from the vertical displacement of the rail as was described for the above disclosed "two-stage" "railway mechanical energy harvester" embodiments for conversion to electrical energy. The resulting "two-stage" "railway mechanical energy harvesters" may be designed by just replacing the "Mechanical Energy Transfer Mechanism", FIG. 5, component of the above disclosed harvester embodiments as described below.

Figure 13:
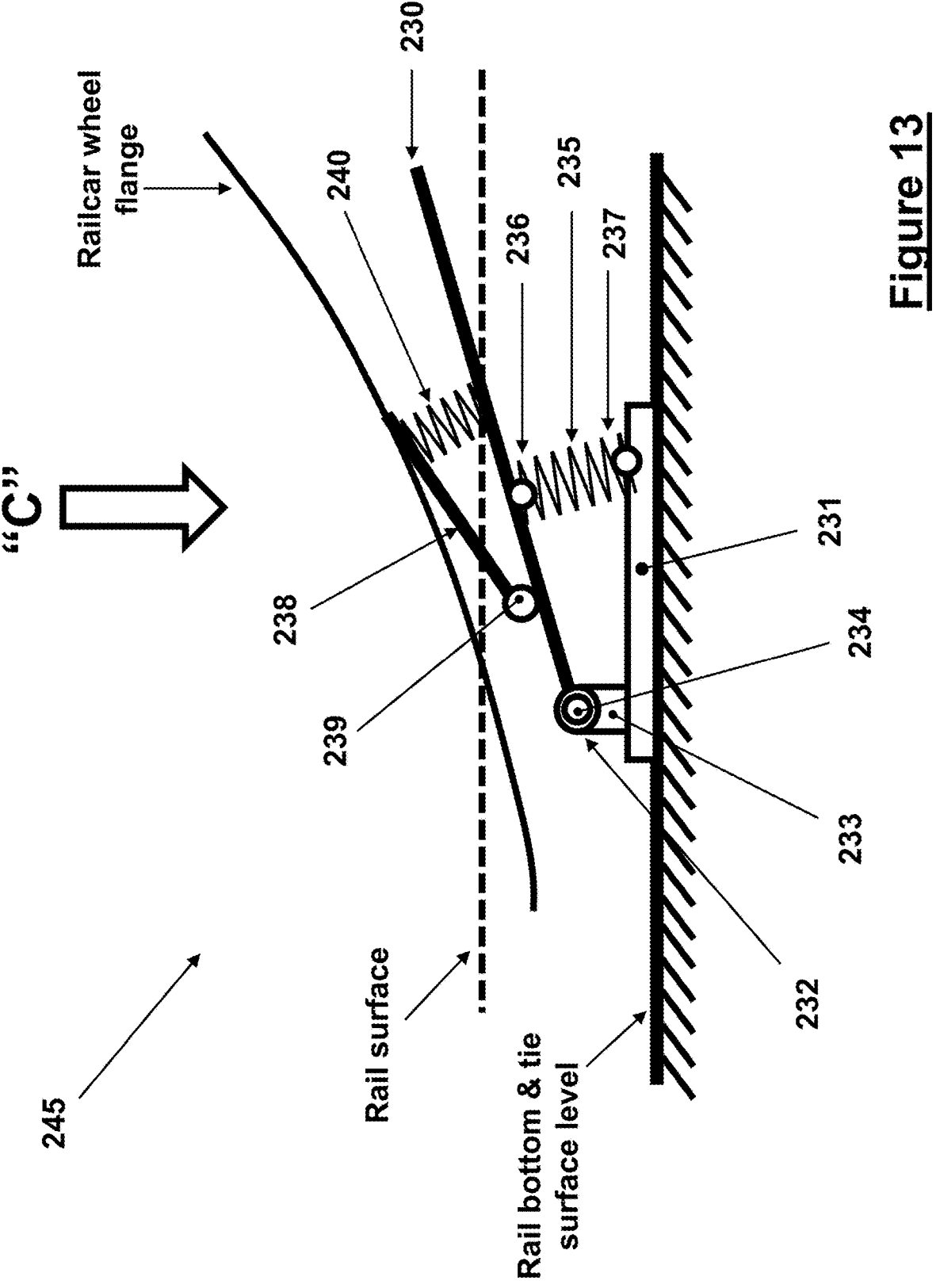
FIG. 13 illustrates the side view the railcar wheel actuated mechanism of the "Mechanical Energy Transfer Mechanism" of the first embodiment of the railcar wheel flange operated "two-stage" "railway mechanical energy harvester".

FIG. 13 shows the side view of the railcar wheel actuated mechanism of the "Mechanical Energy Transfer Mechanism" of the first embodiment 245 of the railcar wheel flange operated "two-stage" "railway mechanical energy harvester". As can be seen in the schematic of FIG. 13, the railcar wheel actuated mechanism of the "Mechanical Energy Transfer Mechanism", is usually mounted over the rail ties via its base structure 231 or may be designed to be attached directly to the side of the rail between the two railway rails. The "Mechanical Energy Transfer Mechanism" consists of the link 230, which is attached to the base structure 231 by the rotary joint 232 via the support member 233. A compressive spring 235, which is attached to the link 230 on one end and to the base structure 231 on the other end by rotary joints 236 and 237, respectively, may also be provided to bias the link to the configuration shown in FIG. 13. At the rotary joint 232, the link 230 is fixedly attached to the rotary joint shaft 234, which acts as the rotary input motion to the "Mechanical Energy Storage Device", FIG. 5, of the "two-stage" "railway mechanical energy harvester" as is described later in this disclosure.

A link 238 is also provided that is attached to the link 230 by the rotary joint 239. A preloaded compressive spring 240, which is attached to the link 230 on one end and to the link 238 on the other end is also provided as can be seen in the side view of FIG. 13.

It the schematic of FIG. 13, the outer surface of a section of the railcar wheel flange as it comes into contact with the surface of the link 238 is shown. It is noted that in FIG. 13, the railcar is considered to be moving to the right as viewed in the plane of FIG. 13 and the railcar wheel would thereby be rotating in the clockwise direction. It is appreciated that the link 238 is provided with a wide enough surface that would ensure full contact with the bottom surface of the railcar wheel flange.

Figure 14:
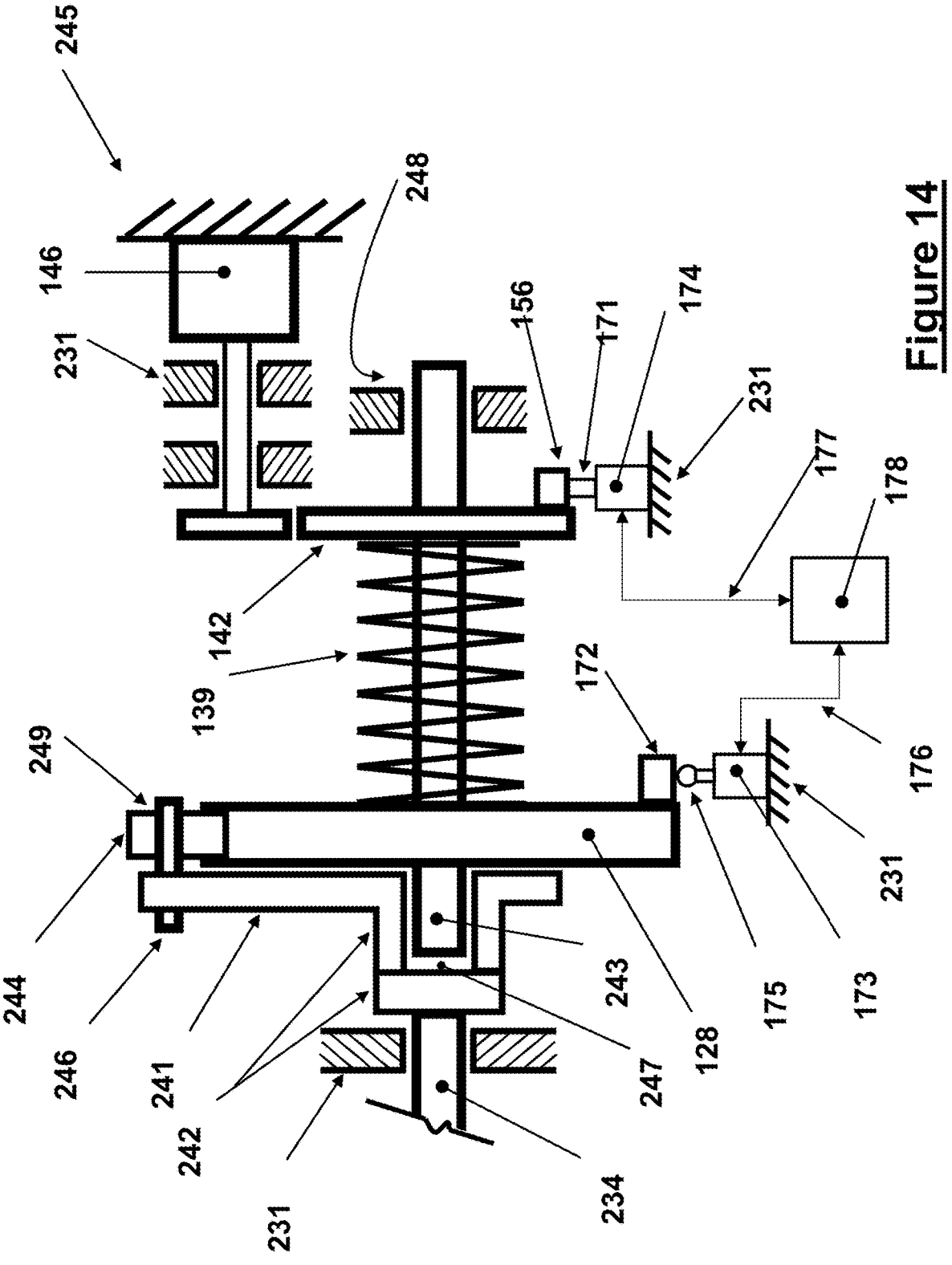
FIG. 14 illustrates the top view "C" of the side view of the embodiment of FIG. 13 of the first embodiment of the railcar wheel flange operated "two-stage" "railway mechanical energy harvester".

Then as the railcar wheel rotates and advances the railcar to the right as viewed in the plane of FIG. 13, the railcar wheel flange forces the link 238 to begin to rotate in the clockwise direction, thereby causing the preloaded compressive spring 240 to begin to deform in compression if the rotary resistance provided by the link 230 (due to the equivalent inertia of the link 230 together with the connected components of the "Mechanical Energy Transfer Mechanism", FIG. 14, and friction forces between the moving surfaces) is greater than its preloading level, or begin to deform in compression and rotate the link 230 in the clockwise direction if the rotary resistance provided by the link 230 is lower than its preloading level. It is appreciated by those skilled in the art that the rotary resistance of the link 230 is dependent on the force applied to the link by the link 238 (through the spring 240 and the joint 239) and its rate (which is dependent on the speed of railcar travel) and the effective inertial of the connected components that would be resisting the applied rotational acceleration of the link 230.

The function of the preloaded compressive spring 240 is to limit the rate of clockwise rotation of the link 230 as the railcar wheel engages and cause the link 230 to begin to rotate in the clockwise direction. The presence of a relatively low inertia engaging link 238 and the presence of the compressive spring 240, which would deform if the dynamic resisting torque of the link 230 (and other components linked to the shaft 234 that are described later) is above the preloading force of the spring 240. As a result, the provision of the lightweight link 238 and the compressive spring 240 would result in the input jerk to the "Mechanical Energy Transfer Mechanism" of the harvester, such as when the railcar is traveling at high speeds, to be minimized.

In the schematic of the "two-stage" "railway mechanical energy harvester" embodiment 245 of FIG. 13, the link 238 is seen to have a straight profile. However, the profile of the link 238 that comes into contact with the railcar wheel flange may be curved to minimize sliding action between their contacting surfaces.

It is appreciated by those skilled in the art that the rotation of the shaft 234 of the railcar wheel actuated mechanism of the "Mechanical Energy Transfer Mechanism" of the first embodiment 245 may be adapted for use in any of the above embodiments for actuating the ratchet arms of the "two-stage" "railway mechanical energy harvester" embodiments. Herein, as an example of such adaptation, the "Mechanical Energy Transfer Mechanism" is adapted to operate the "two-stage" "railway mechanical energy harvester" embodiment 170 of FIG. 10, with the resulting harvester being indicated as the embodiment 245, the top view "C", FIG. 13, of which is shown in FIG. 14. In the schematic of FIG. 14, all components that are identical to those of the embodiment 170 are indicated with the same numerals.

As can be seen in the top view of FIG. 14, the shaft 234 of the railcar wheel actuated mechanism of the "Mechanical Energy Transfer Mechanism", FIG. 13, is fixedly attached to the ratchet arm 241 via the adaptor member 242. The adapter member 242 is provided with the pocket 247, within which the mounted shaft 243 is free to rotate. The shaft 243 is supported by the structure 231 of the "two-stage" "railway mechanical energy harvester" via the rotary joint 248. The actuating paw 244 (126 in FIG. 6) is similarly attached to the ratchet arm 241 by the rotary joint 249 with the shaft 246. As was described for the embodiment of FIG. 6, the pawl 244 is provided with a preloaded torsion spring or the like (not shown) to bias it to stay in engagement with the teeth (129 in FIG. 6) of the ratchet 128. Like the embodiment of FIG. 10, the ratchet 128 is free to rotate over the shaft 243.

The "two-stage" "railway mechanical energy harvester" embodiment 245 of FIGS. 13 and 14 then operates as follows. The passing of each railcar wheel over the rail segment where the "Mechanical Energy Transfer Mechanism", FIG. 13, of the harvester is mounted would cause the link 230 to be rotated in the clockwise rotation with minimal jerk and return to its initial configuration shown in FIG. 13. The clockwise rotation of the of the shaft 234 due to the railcar wheel passing would rotate the connected ratchet arm 241, FIG. 14, in the clockwise direction (as viewed in the direction of the shaft 234 to the ratchet 128), thereby causing the pawl 249 to rotate the ratchet 128 in the clockwise direction, thereby transferring the input mechanical energy from the railcar wheel motion to the mechanical potential energy storage torsion spring 139 as was described for the "two-stage" "railway mechanical energy harvester" embodiment 170 of FIG. 10. Once the railcar wheel has passed and the links 238 and 230 have been released, the compressive springs 235 and 240 would force the links back to their initial configurations shown in FIG. 13. In general, stop members (not shown) are usually provided to limit the link rotations to the desired configuration, FIG. 13, and allow for preloading of the compressive springs.

Then, as mechanical energy is being transferred and stored in the torsion spring 139 by clockwise rotation of the ratchet 128, as was previously described for the embodiment 170 of FIG. 10, clockwise rotation of the gear 142 is prevented by the member 171, which is attached to the sliding member of the electrical solenoid 174. Here, the member 171 is positioned under the stop member 156 of the gear 142 and is pulled back from under the stop member 156 when the actuating solenoid 174 is energized by the control unit 178 via the line 177, which is usually powered by the harvester generated and stored electrical energy unit (not shown). Here again the gear 142 may be provide with large enough moment of inertia to also function as a flywheel to store the released mechanical energy as kinetic energy and transfer it to the electrical generator 146 for conversion to electrical energy over an extended length of time. The signal for energizing the solenoid 174 is provided by a sensor 173 that is detecting the presence of the member 172, which is fixedly attached to the ratchet 128. The sensor 173 may be a microswitch with the contacting member 175 or may be proximity switch or optical switch or the like known in the art and sends its detection signal to the control unit 178 via the line 176.

It is appreciated that more than one member 172 may be provided around the outer surfaces of the ratchet (or the ratchet teeth may be used directly) so that the control unit 178 could allow a prescribed amount of clockwise rotation of the ratchet 128 before releasing the gear/flywheel 142 and transferring the stored mechanical potential energy to the electrical generator 146 for conversion to electrical energy over an appropriate length of time.

It is appreciated by those skilled in the art that the railcar wheel actuated mechanism of the "Mechanical Energy Transfer Mechanism" of the "two-stage" "railway mechanical energy harvester" embodiment 245 of FIGS. 13 and 14 may also be used in the previously disclosed embodiments to transfer mechanical energy to the "Mechanical Energy Storage Devices" of the harvesters.

It is appreciated that the "two-stage" "railway mechanical energy harvester" embodiment 245 of FIGS. 13 and 14 have an advantage over the other disclosed embodiments that harvest mechanical energy from the vertical displacement of a rail section since it can be directly (and rapidly) attached to a tie or between the ties adjacent to a rail section by its base structure and similarly removed when not needed or for repair or maintenance. The only shortcoming could be that since it is on the side of the rail and visible, it might be subjected to tampering when located in unprotected and open areas.

It is also appreciated by those skilled in the art that the "two-stage" "railway mechanical energy harvester" embodiment 245 of FIGS. 13 and 14 may also be manually operated by the user pressing down on the link 238 and/or 230 by foot (or hand) similar to operating a car bicycle tire pump. Alternatively, the harvester may be manually operated by attaching a handle (similar to the handle 226 in FIG. 7) to the shaft 234, FIG. 13, and using it to wind the torsion spring 139.

Figure 13A:
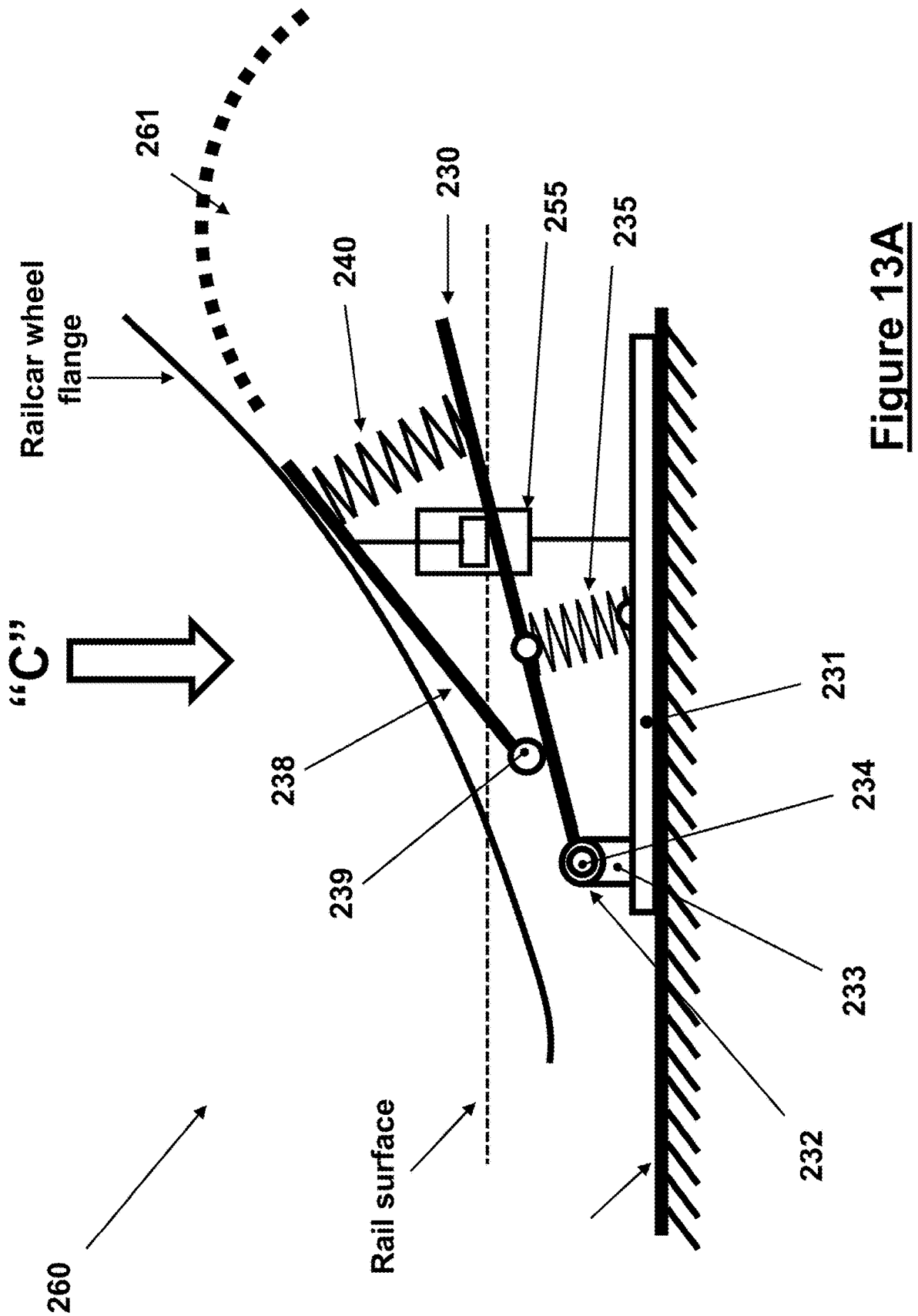
FIG. 13A illustrates the side view a modified railcar wheel actuated mechanism of the "Mechanical Energy Transfer Mechanism" of the embodiment of FIG. 13 of the railcar wheel flange operated "two-stage" "railway mechanical energy harvester".

FIG. 13A illustrates the side view of a modified "two-stage" "railway mechanical energy harvester" embodiment 245 of FIGS. 13 and 14, indicated as the embodiment 260, which is designed to transfer a significantly larger portion of the available mechanical energy from the passing railcar wheel flange actuation In the modified "two-stage" "railway mechanical energy harvester" embodiment 260 shown in the side view schematic of FIG. 13A, all components of the harvester are identical to those of the embodiment 245 of FIGS. 13 and 14, except for the addition of the one-way damper 255, which is connected on one end to the link 238 and on the other end to the base structure 213 as shown in the schematic of FIG. 13A. The one-way damper 255 is configured to provide a significant resistance to extension but would essentially allow free contraction.

In the modified "two-stage" "railway mechanical energy harvester" embodiment 260, the "Mechanical Energy Transfer Mechanism" is also usually mounted over the rail ties via its base structure 231 or may be designed to be attached directly to the side of the rail between the two railway rails.

At the rotary joint 232, the link 230 is also fixedly attached to the rotary joint shaft 234, which acts as the rotary input motion to the "Mechanical Energy Storage Device", FIG. 5, of the "two-stage" "railway mechanical energy harvester" as was described for the embodiment 245 of FIGS. 13 and 14. The usually preloaded compressive spring 235 is provided primarily to bias the link 230 to its rest position shown in FIGS. 13 and 13A. In general, a stop member (not shown) is provided to keep the link 230 in its rest positioning and keep the compressive spring 235 preloaded. It is also appreciated by those skilled in the art that the compressive spring 235 may be replaced by a preloaded torsion spring at the joint 232 to serve the same purpose of biasing the link 230 to its rest position against the provided stop.

The "two-stage" "railway mechanical energy harvester" embodiment 260 of FIG. 13A operates as follows. As the railcar wheel rotates and advances the railcar to the right as viewed in the plane of FIG. 13A, the railcar wheel flange forces the link 238 to begin to rotate in the clockwise direction, thereby causing the preloaded compressive spring 240 to begin to deform in compression if the rotary resistance provided by the link 230 (due to the equivalent inertia of the link 230 together with the connected components of the "Mechanical Energy Transfer Mechanism", FIG. 14, and friction forces between the moving surfaces) is greater than its preloading level, or begin to deform in compression and rotate the link 230 in the clockwise direction if the rotary resistance provided by the link 230 is lower than its preloading level. It is appreciated by those skilled in the art that the rotary resistance of the link 230 is dependent on the force applied to the link by the link 238 (through the spring 240 and the joint 239) and its rate (which is dependent on the speed of railcar travel) and the effective inertial of the connected components that would be resisting the applied rotational acceleration of the link 230.

The function of the preloaded compressive spring 240 and the one-way damper 255 is to limit the rate of clockwise rotation of the link 230 as the railcar wheel engages and cause the link 230 to begin to rotate in the clockwise direction. The presence of a relatively low inertia engaging link 238 and the presence of the compressive spring 240, which would deform if the dynamic resisting torque of the link 230 (and other components linked to the shaft 234 that are described later) is above the preloading force of the spring 240. As a result, the provision of the lightweight link 238 and the compressive spring 240 would result in the input jerk to the "Mechanical Energy Transfer Mechanism" of the harvester, such as when the railcar is traveling at high speeds, to be minimized.

In the schematic of the "two-stage" "railway mechanical energy harvester" embodiment 260 of FIG. 13A, the link 238 is seen to have a straight profile. However, the profile of the link 238 that comes into contact with the railcar wheel flange may be curved to minimize sliding action between their contacting surfaces.

It is appreciated by those skilled in the art that the rotation of the shaft 234 of the railcar wheel actuated mechanism of the "Mechanical Energy Transfer Mechanism" of the modified embodiment 260 of FIG. 13A may be adapted for actuating the ratchet arms of the "two-stage" "railway mechanical energy harvester" of other embodiments. Herein, as an example of such adaptation, the "Mechanical Energy Transfer Mechanism" is adapted to operate the "two-stage" "railway mechanical energy harvester" embodiment 170 of FIG. 10, with the resulting harvester being indicated as the embodiment 260, the top view "C", FIG. 13A, of which is shown in FIG. 14. In the schematic of FIG. 14, all components that are identical to those of the embodiment 170 are indicated with the same numerals.

As can be seen in the top view of FIG. 14, the shaft 234 of the railcar wheel flange actuated mechanism of the "Mechanical Energy Transfer Mechanism", FIG. 13A, is fixedly attached to the ratchet arm 241 via the adaptor member 242. The adapter member 242 is provided with the pocket 247, within which the mounted shaft 243 is free to rotate. The shaft 243 is supported by the structure 231 of the "two-stage" "railway mechanical energy harvester" via the rotary joint 248. The actuating paw 244 (126 in FIG. 6) is similarly attached to the ratchet arm 241 by the rotary joint 249 with the shaft 246. As was described for the embodiment of FIG. 6, the pawl 244 is provided with a preloaded torsion spring or the like (not shown) to bias it to stay in engagement with the teeth (129 in FIG. 6) of the ratchet 128. Like the embodiment of FIG. 10, the ratchet 128 is free to rotate over the shaft 243.

The "two-stage" "railway mechanical energy harvester" embodiment 260 of FIGS. 13A and 14 then operates as follows. The passing of each railcar wheel over the rail segment where the "Mechanical Energy Transfer Mechanism", FIG. 13A, of the harvester is mounted would cause the link 238 to rotate in the clockwise direction, deform the spring 240 in compression and store part of the input mechanical energy in the spring 240 as mechanical potential energy, and also rotate the link 230 certain amount as was described previously, depending on the speed of the railcar. In the meantime, the one-way damper 255 provides minimal resistance to the motion of the link 238 due to its selected type. The presence of the springs 240 and 235 and the one-way damper 255 ensures that the clockwise rotation of the link 230 and thereby the shaft 234, FIGS. 13A and 14, is with minimal jerk. The clockwise rotation of the of the shaft 234 would then rotate the connected ratchet arm 241, FIG. 14, in the clockwise direction (as viewed in the direction of the shaft 234 to the ratchet 128), thereby causing the pawl 249 to rotate the ratchet 128 in the clockwise direction, thereby transferring the input mechanical energy from the railcar wheel motion to the mechanical potential energy storage torsion spring 139 as was described for the "two-stage" "railway mechanical energy harvester" embodiment 170 of FIG. 10.

Now once the railcar wheel flange passes the link 238, the one-way damper 255 prevents the link 238 to quickly return to its rest position of FIG. 13A, thereby the mechanical potential energy stored in the spring 240 is mostly maintained until it is transferred to the mechanical energy storage power spring 139, FIG. 14, via clockwise rotation of the link 230. The one-way damper 255 is then designed to slowly allow the return of the links 230 and 240 to their rest positioning of FIG. 13A by the springs 235 and 240. In general, stop members (not shown) are provided to limit the rotation of the links 235 and 240 to the desired configuration, FIG. 13A, and allow for preloading of these compressive springs.

Then, as mechanical energy is being transferred and stored in the torsion spring 139 by clockwise rotation of the ratchet 128, as was previously described for the embodiment 170 of FIG. 10, clockwise rotation of the gear 142 is similarly prevented by the member 171, which is attached to the sliding member of the electrical solenoid 174. The member 171 is positioned under the stop member 156 of the gear 142 and is pulled back from under the stop member 156 when the actuating solenoid 174 is energized by the control unit 178 via the line 177, which is usually powered by the harvester generated and stored electrical energy unit (not shown). Here again the gear 142 may be provide with large enough moment of inertia to also function as a flywheel to store the released mechanical energy as kinetic energy and transfer it to the electrical generator 146 for conversion to electrical energy over an extended length of time. The signal for energizing the solenoid 174 is provided by a sensor 173 that is detecting the presence of the member 172, which is fixedly attached to the ratchet 128. The sensor 173 may be a microswitch with the contacting member 175 or may be proximity switch or optical switch or the like known in the art and sends its detection signal to the control unit 178 via the line 176.

It is noted that due to the very short duration of the railcar wheel flange input actuation, the instant equivalent inertia of the underlying mechanism would cause part of the input mechanical energy to be stored in the interfacing spring 240 due to its significantly lower equivalent inertia. As a result, the duration of the input mechanical energy pulse into the "Mechanical Energy Transfer Mechanism" is significantly increased.

Then as more railcar wheels pass over the rail section to which the "two-stage" "railway mechanical energy harvester" embodiment 260 of FIGS. 13A and 14 is attached to, the ratchet 128 continues to be rotated and more mechanical potential energy is stored in the torsion spring 139, FIG. 14. Then eventually after the prescribed stored mechanical energy threshold level has been reached, the gear 142 is released as was previously described for the embodiment 170 of FIG. 10, thereby allowing the mechanical potential energy stored in the mechanical energy storage power spring 139 to be transferred to the gear/flywheel 142 as kinetic energy and from there to the electrical generator 146 for conversion to electrical energy.

It is appreciated that more than one member 172 may be provided around the outer surfaces of the ratchet 128 (or the ratchet teeth may be used directly) so that the control unit 178 could allow a prescribed amount of clockwise rotation of the ratchet 128 before releasing the gear/flywheel 142 and transferring the stored mechanical potential energy to the electrical generator 146 for conversion to electrical energy over an appropriate length of time.

It is appreciated by those skilled in the art that the railcar wheel actuated mechanism of the "Mechanical Energy Transfer Mechanism" of the "two-stage" "railway mechanical energy harvester" embodiment 245 of FIGS. 13A and 14 may also be used in the previously disclosed embodiments to transfer mechanical energy to the "Mechanical Energy Storage Devices" of the harvesters.

It is appreciated that the "two-stage" "railway mechanical energy harvester" embodiment 260 of FIGS. 13A and 14 have an advantage over the embodiment 245 of FIGS. 13 and 14 since it harvest a significantly larger portion of the available energy due to the addition of the one-way damper 255, which blocks the of the portion of mechanical potential energy stored in the spring 240 as the railcar wheel flange disengages the link 238 from being wasted and not transmitted to the energy storage power spring 139.

It is also appreciated by those skilled in the art that the "two-stage" "railway mechanical energy harvester" embodiment 260 of FIGS. 13A and 14 may also be manually operated by the user pressing down on the link 238 and/or 230 by foot (or hand) like operating a car bicycle tire pump. Alternatively, the harvester may be manually operated by attaching a handle (like the handle 226 in FIG. 7) to the shaft 234, FIG. 13A, and using it to wind the torsion spring 139.

Figure 14A:
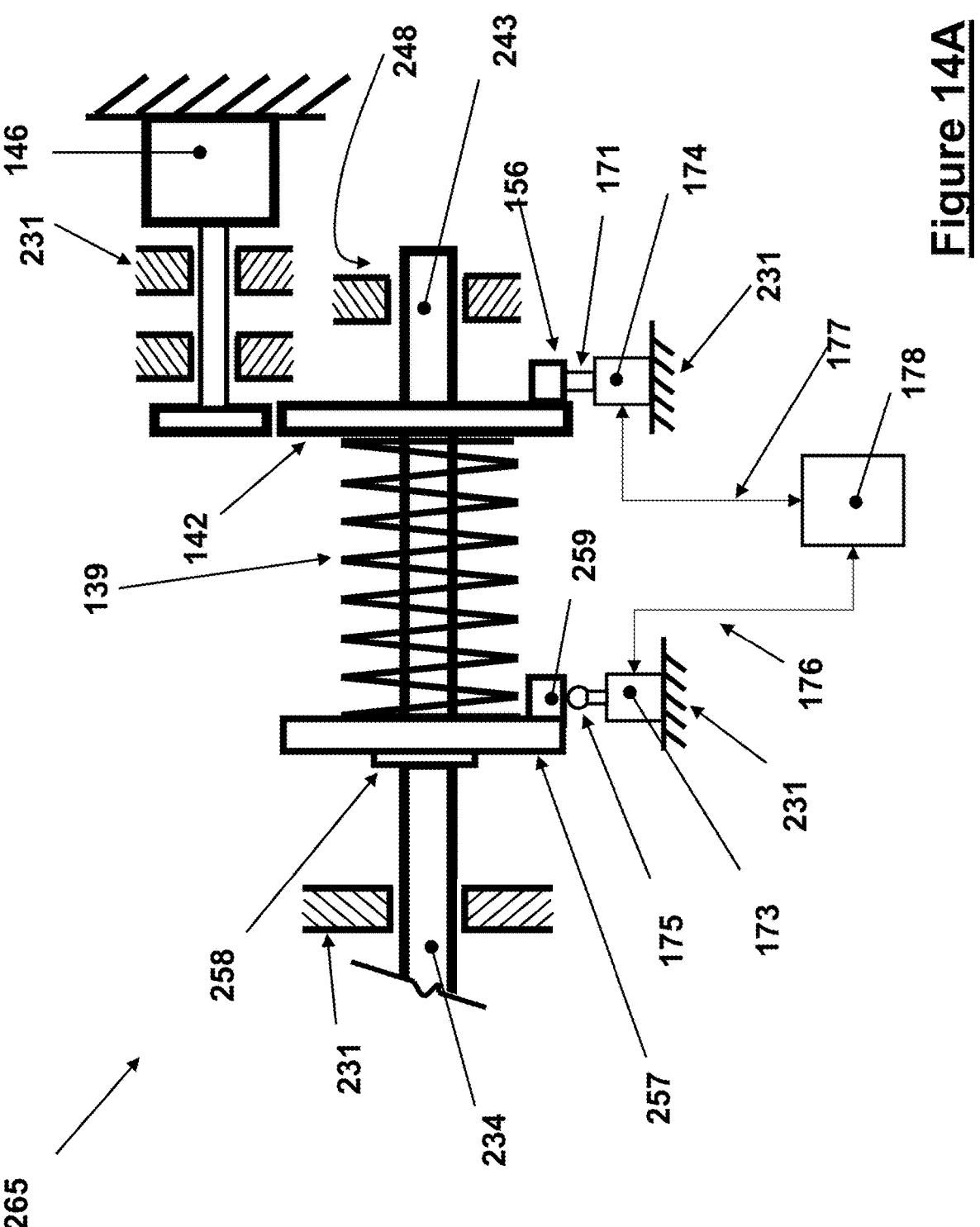
FIG. 14A illustrates the top view "C" of the side view of the embodiment of FIGS. 13 and 13A of the with a modified way for input motion connection to the power spring winding mechanism of FIG. 14.

FIG. 14A illustrates the view "C", FIGS. 13 and 13A, of modified "two-stage" "railway mechanical energy harvester" embodiments 246 and 260, indicated as the embodiment 265, which is designed to transfer a significantly larger portion of the available mechanical energy from the passing railcar wheel flange actuation It is appreciated by those skilled in the art that the rotation of the shaft 234 of the railcar wheel actuated mechanism of the "Mechanical Energy Transfer Mechanism" of the "two-stage" "railway mechanical energy harvester" embodiments 245 and 260 may be similarly adapted as described below for the embodiment 265 for use in any of the above "two-stage" "railway mechanical energy harvester" embodiments for winding their energy storage power springs. Herein, as an example of such adaptation, the "Mechanical Energy Transfer Mechanism" is adapted to operate the "two-stage" "railway mechanical energy harvester" embodiment 170 of FIG. 10, with the resulting harvester being indicated as the embodiment 265, the top view "C", FIG. 13A, of which is shown in FIG. 14A. In the schematic of FIG. 14A, all components that are identical to those of the embodiment 170 are indicated with the same numerals.

As can be seen in the top view of FIG. 14A, the shaft 234 of the railcar wheel actuated mechanism of the "Mechanical Energy Transfer Mechanism", FIG. 13 of 13A, is connected to the shaft 243 of the energy storage mechanism via the coupling member 257 by a one-way clutch member 258. The coupler 257 is fixedly attached to the shaft 243. The mechanical energy storage torsion spring 139 is fixedly attached to the surface of the coupling member 257 on one end as seen in FIG. 14A, and as was previously indicated to the gear/flywheel 142 on the other end. The one-way clutch member 258 is configured to transmit clockwise rotation (as viewed from right to left along the shaft 234 in FIG. 14A) of the input shaft 234 to the shaft 243 but freely rotate in the counterclockwise direction relative to the shaft 243. The shaft 243 is supported by the structure 231 of the "two-stage" "railway mechanical energy harvester" via the rotary joint 248.

The "two-stage" "railway mechanical energy harvester" embodiment 265 of FIG. 13 or 13A and the view "C" of FIG. 14A then operates as follows. The passing of each railcar wheel over the rail segment where the "Mechanical Energy Transfer Mechanism", FIGS. 13 and 13A, of the harvester is mounted would then cause the link 230 to be rotated in the clockwise rotation with minimal jerk and return to its initial configuration shown in FIG. 13A. The resulting clockwise rotation of the of the shaft 234 due to the railcar wheel passing would rotate the connected shaft 243 in the clockwise direction, FIG. 14A, thereby transferring the input mechanical energy from the railcar wheel motion to the mechanical potential energy storage torsion spring 139 as was described for the "two-stage" "railway mechanical energy harvester" embodiment 170 of FIG. 10. Once the railcar wheel has passed and the links 238 and 230 have been released and the remaining mechanical energy in the compressive spring 240 has been transferred to the torsion spring 139, the springs 235 and 240 would force the links back to their initial configurations shown in FIGS. 13 and 13A. In general, stop members (not shown) are usually provided to limit the link rotations to the desired configuration and allow for preloading of the compressive springs.

It is appreciated that the "two-stage" "railway mechanical energy harvester" embodiments 245, 260 and 265, and any other disclosed embodiments that uses the railcar wheel flange actuated mechanisms of FIG. 13 or 13A to transfer available energy from passing railcars can only operate the mechanism while traveling in one direction, i.e., towards the right as viewed in the schematics of FIGS. 13 and 13A. In some cases, the railway traffic is either in both direction and in certain circumstances the train must travel in both directions. To accommodate two-way railcar travel, the profile of the link 238 need only be modified to a shape, such as that shown in FIG. 13A with the added dashed line section, to enable the link to accommodate wheel travel in either direction.

In the "two-stage" "railway mechanical energy harvester" embodiments 170, 14 and 14A, the sensor 173 used to determine if the prescribed level of stored mechanical energy threshold in the mechanical energy storage power spring 139 has been reached so that the control unit 178 would actuate the solenoid 174 to release the gear/flywheel 142 are all powered by electrical energy that has been generated and stored in the electrical energy storage of the harvester system, FIG. 5. However, it is appreciated that before the harvester has generated enough electrical energy for powering the sensor 173, solenoid 174 and the control unit 178, or if the level of stored electrical energy has dropped below the required level for powering these components, the "two-stage" "railway mechanical energy harvester" must still be operational and generate enough electrical energy until enough electrical energy becomes available for the harvester system to operate as previously described, i.e., sense the level of stored mechanical energy in the power spring 139 and then actuate the solenoid 178.

To accommodate the initial no-power operation of the "two-stage" "railway mechanical energy harvester" embodiments 170, 245 and 265 of FIGS. 10, 14 and 14A, respectively, the solenoid 174 may be replaced by any electrically actuated mechanical switch known in the art that is normally in the position of withdrawn stop member 171. As a result, when electrical energy is not available from the harvester system or any other external source, then the input rotation of the shaft 234 is directly transmitted to the electrical generator and electrical energy is still generated, even though not efficiently, until enough electrical energy is stored in the harvester system electrical energy storage rechargeable batteries or capacitors to power the control unit 178, sensor 173 and the electrically actuated switch replacing the solenoid 178.

It is appreciated that as the "two-stage" "railway mechanical energy harvester" embodiments 170, 245 and 265 of FIGS. 10, 14 and 14A, respectively, generate electrical energy due to the passing of railway cars, then at some point the electrical energy storage elements of the harvester, such as rechargeable batteries and/or super-capacitors or the like may become fully charged. At such points, the railcar wheel flange interfacing mechanism of FIGS. 13 and 13A are desired to stop wheel flange engagement to minimize their wear and tear and thereby prolong their life and minimize maintenance and service-related costs. This capability may be provided as shown in the embodiment 270 of FIG. 14B by providing the member 262 (such as disc shaped), which is fixedly attached to the shaft 234. The member 262 is then provided with the stop member 263, which would engage the sliding member 266 of the solenoid 264 when commanded by the control unit 178. As can be seen in the schematic of FIG. 14B, the sliding member 266 of the solenoid 264 engages the top surface of the stop 263, thereby when engaged, it prevents counterclockwise rotation of the shaft 234. The stop member 263 is positioned on the member 262 such that once engaged, the shaft 234 is prevented to rotate back in the counterclockwise direction to return the links 238 and 230 back to their initial positioning shown in FIG. 13A.

Figure 15:
FIG. 15 illustrates a typical block diagram of a "two-stage" "railway mechanical energy harvester" system with its electrical energy regulating and electrical energy storage charging control and electrical energy consuming devices.

Clockwise rotation of the gear 142 is prevented by the member 171, which is attached to the sliding member of the electrical solenoid 174. Here, the member 171 is positioned under the stop member 156 of the gear 142 and is pulled back from under the stop member 156 when the actuating solenoid 174 is energized by the control unit 178 via the line 177, which is usually powered by the harvester generated and stored electrical energy unit (not shown). The signal for energizing the solenoid The end 151 of the sliding link 149 in normally in contact with the link 152, which is attached to the structure 117 of the "two-stage" "railway mechanical energy harvester" 110 by the rotary joint 153 via the support member 154. In the configuration shown in FIG. 7, the tip 155 of the link 152 is seen to be positioned under the stop member 156 of the gear 142, which would prevent clockwise rotation of the gear (as viewed in the plane of FIG. 6) as the torsion spring 139 is wound as described later in this disclosure. The link 152 is biased against a stop (not shown for the sake of clarity) that limits its further counterclockwise rotation as viewed in the plane of FIG. 7 by the preloaded compressive spring 157, which is positioned against the link 152 on one end and the structure 117 of the "two-stage" "railway mechanical energy harvester" 110 on the other end. It is also highly desirable that the energy harvesting component of the "railway energy harvesting power system" be capable of disengaging from passing train "actuation" mechanism once the electrical energy storage is full FIG. 15 illustrates a typical block diagram of a "two-stage" "railway mechanical energy harvester" system with its electrical energy regulating and electrical energy storage charging control and electrical energy consuming devices. In this system, the generated electrical energy by the "two-stage" "railway mechanical energy harvester" is collected and regulated and used to charge the provided electrical energy storage unit(s) by the electronics of the control unit. The electrical energy storage units typically consist of rechargeable batteries and/or battery packs such as Lithium-ion, Lithium-polymer, Lead-acid or other types of recharge-able batteries. When the generated electrical energy levels do peak at levels that the provided rechargeable batteries cannot absorb, super-capacitors may be provided to absorb the peak generated power.

When a "two-stage" "railway mechanical energy harvester" system is provided in remote tunnels with low train traffics, motion sensors may be provided to conserve stored electrical energy for lighting and the like only when a train is passing through or railroad personnel are at work in the tunnel. The previously described manual charging capability can be useful for such applications.

It is appreciated by those skilled in the art that the disclosed "two-stage" "railway mechanical energy har-vester" system may also be used to sense the arrival and departure of trains, their speed and acceleration and other collected sensory information and transmit (broadcast) the information as well as the related timing information to the railway control stations monitoring the train movements.

It is also appreciated that as shown in the block diagram of FIG. 15, motion sensors or other sensors known in the art may also be used to provide input into the a "two-stage" "railway mechanical energy harvester" system control unit to activate various components and systems that are pow-ered by the harvester generated and/or stored power, such as lights in the dark tunnels or at night or transmitting a warning signal or to incoming trains, etc.

While there has been shown and described what is con-sidered to be preferred embodiments of the invention, it will, of course, be understood that various modifications and changes in form or detail could readily be made without departing from the spirit of the invention. It is therefore intended that the invention be not limited to the exact forms described and illustrated but should be constructed to cover all modifications that may fall within the scope of the appended claims.

What is claimed is:

1. A method for harvesting energy from a train passing over a railroad rail, the method comprising:

transferring a deflection of the rail from the train to a mechanical energy storage device with a transfer mechanism;

storing mechanical energy provided by the transfer mechanism until a predetermined amount of mechani-cal energy is stored;

transferring the stored mechanical energy to a generator upon the stored mechanical energy reaching the pre-determined amount; and converting the transferred mechanical energy to electrical energy;

wherein the transfer of the stored mechanical potential energy to a mechanism disposed between the transfer mechanism and the generator is over a time duration that is longer than an input pulse to the transfer mecha-nism due to the rail displacement caused by the train passing over the rail.

2. The method of claim 1, wherein the transferring of the deflection comprises amplifying an amount of the deflection of the rail.

3. The method of claim 1, wherein the transferring of the deflection comprises converting the deflection of the rail to a rotary motion.

4. The method of claim 1, wherein the storing comprises winding a spring and maintaining the spring in a wound state until the stored mechanical energy reaches the predeter-mined amount.

5. The method of claim 1, further comprising a sensor, wherein the sensor determines whether the stored mechani-cal energy reaches the predetermined amount.

6. The method of claim 1, wherein the converting com-prises using a flywheel and a clutch to selectively connect the flywheel to the generator for converting the transferred mechanical energy to the electrical energy.

7. An energy harvesting apparatus for harvesting energy from a train passing over a railroad rail, the energy harvest-ing apparatus comprising:

a first transfer mechanism for transferring a deflection of the rail from the train to a mechanical energy storage device;

the mechanical energy storage device storing mechanical energy provided by the first transfer mechanism until a predetermined amount of mechanical energy is stored;

a second transfer mechanism for transferring the stored mechanical energy to a generator upon the stored mechanical energy reaching the predetermined amount; and the generator for converting the transferred mechanical energy from the second transfer mechanism to electri-cal energy, wherein the first transfer mechanism comprises:

a one-way damper having one end connected to the rail, and a spring serially connected to the one-way damper, the spring and one-way damper together being config-ured to provide more resistance to extension than to contraction such that the spring transfers the stored mechanical potential energy to the second transfer mechanism over a time duration that is longer than an input pulse to the one-way damper due to the rail displacement caused by the train passing over the rail.

* * * * *